United States Patent [19]
Johnson

[11] 4,345,477
[45] Aug. 24, 1982

[54] SEMICONDUCTION STRESS SENSING APPARATUS

[75] Inventor: Russell L. Johnson, New Brighton, Minn.

[73] Assignee: Honeywell Inc., Minneapolis, Minn.

[21] Appl. No.: 212,657

[22] Filed: Dec. 3, 1980

[51] Int. Cl.³ .............................................. G01B 7/18
[52] U.S. Cl. ................................. 73/766; 338/22 SD; 357/26
[58] Field of Search ................ 73/766, 765, 777, 767, 73/721; 338/4, 22 SD; 357/26

[56] References Cited

U.S. PATENT DOCUMENTS

| | | | |
|---|---|---|---|
| 3,161,045 | 12/1964 | Ames, Jr. | |
| 3,161,821 | 12/1964 | Price et al. | 323/75 |
| 3,629,719 | 12/1971 | Heller et al. | 330/69 |
| 3,646,815 | 3/1972 | Martin et al. | 73/398 AR |
| 3,836,796 | 9/1974 | Solomon et al. | 73/766 X |
| 3,841,150 | 10/1974 | Pearson . | |
| 3,847,017 | 11/1974 | Watts . | |
| 3,886,799 | 6/1975 | Billette et al. | 73/398 AR |
| 3,893,228 | 7/1975 | George et al. | 29/580 |
| 3,956,927 | 5/1976 | Pearson . | |
| 4,035,823 | 7/1977 | Marshall | 357/26 |
| 4,096,382 | 6/1978 | Numata et al. | 250/214 A |
| 4,125,820 | 11/1978 | Marshall | 338/4 |
| 4,202,218 | 5/1980 | Romo | 73/766 |
| 4,205,556 | 6/1980 | Runyan | 73/727 |

Primary Examiner—Jerry W. Myracle
Attorney, Agent, or Firm—Theodore F. Neils

[57] ABSTRACT

An integrated circuit stress transducer system including signal processing circuitry responsive to signals from semiconductor stress sensors where the processing circuitry output signals are compensated for sensor stress sensitivity variations.

59 Claims, 7 Drawing Figures

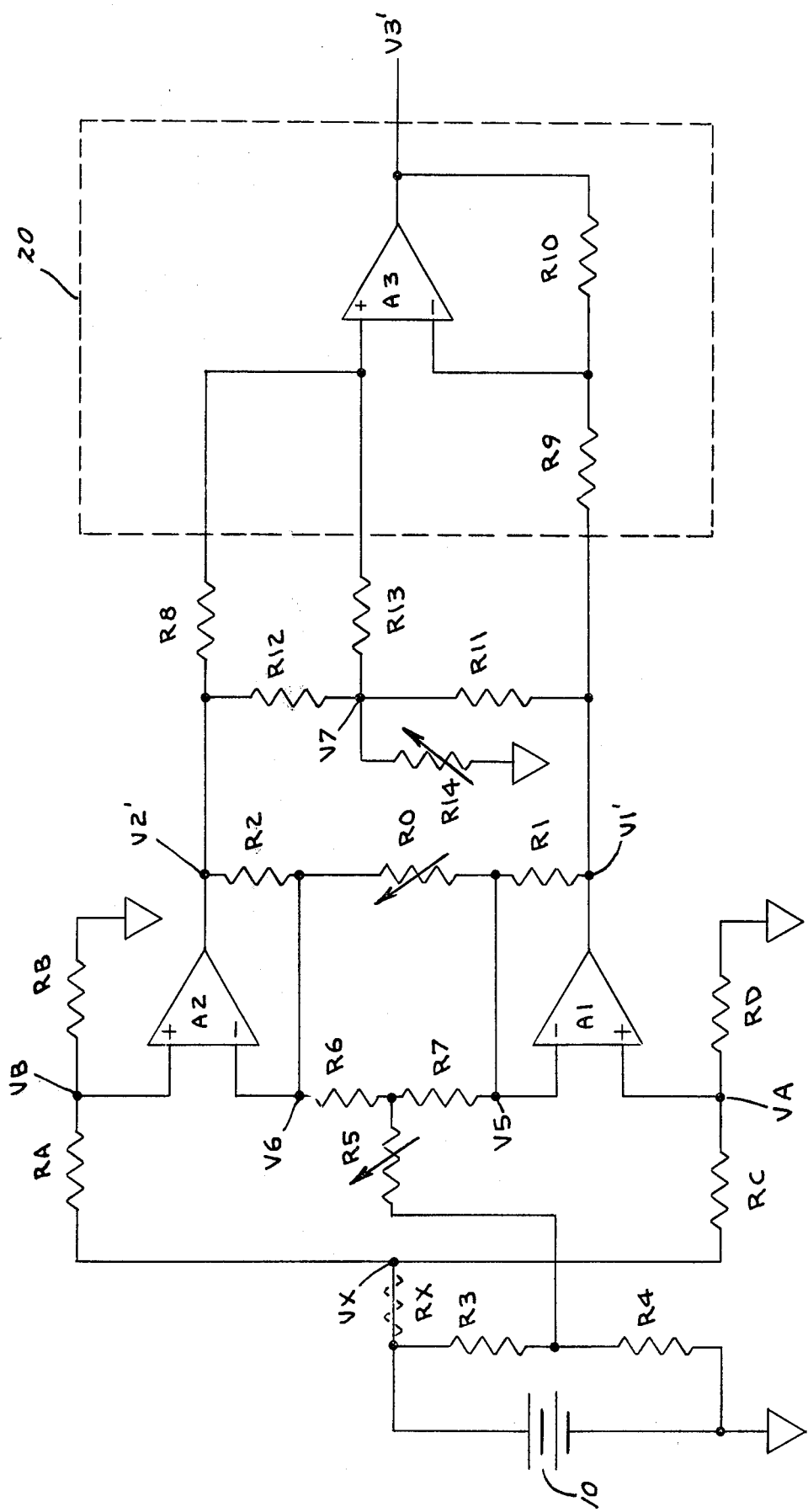

SEMICONDUCTION STRESS SENSING APPARATUS

BACKGROUND OF THE INVENTION

The use of the piezoresistive effect in silicon as the transduction basis for a semiconductor stress or pressure sensor is well known and such stress sensors are widely used. Such semiconductor stress sensors are disclosed, by Marshall in U.S. Pat. Nos. 4,035,823 and 4,125,820 entitled, "Stress Sensor Apparatus" which are both assigned to the present assignee. Typically, a p-type conductivity region is formed in an n-type conductivity silicon layer by diffusion or ion implantation techniques so that this p-type region serves as a pn junction isolated resistor which forms the semiconductor stress sensor, i.e. a piezoresistor. Usually, this resistor is provided in and on a semiconductor body comprising a substrate having structural portions including both a diaphragm portion and a constraint portion for constraining the diaphragm at peripheral portions thereof. The pn junction isolated resistor is located at least in part in the diaphragm portion. The diaphragm in operation is exposed to a source of stress. By electrically contacting the p-type region, or piezoresistor, at two points and measuring the resistance changes between these two contact points before and during applications of stress, the magnitude of applied stress can be determined because of the known piezoresistive response of the piezoresistor in the diaphragm portion of the substrate.

The semiconductor stress sensor, or piezoresistor, performance characteristics are strongly dependent upon (a) the dopant distribution therein, including the maximum dopant concentration in the piezoresistor; and (b) the mechanical structures supporting the piezoresistor, i.e. its placement in the diaphragm as part of the diaphragm.

The total resistance value of the piezoresistor at any given temperature is, of course, related to the total amount of dopant atoms provided in the region in which it is formed. On the other hand, the temperature coefficient of resistance (TCR) of the piezoresistor is related primarily to the maximum dopant concentration occurring in this same region.

The change in the piezoresistor resistance value as a function of temperature at a constant applied stress condition can, of course, be described in fractional terms by the piezoresistor TCR, $\partial R/\partial T/R(T0)$, or in absolute units simply by $\partial R/\partial T$. The change in resistance value as a function of stress at a constant ambient temperature is the stress sensor transduction performance, $\partial R/\partial (stress)$, herein referred to as Pi.

The stress sensor transduction performance, Pi, over temperature has been found to be primarily related to the maximum dopant concentration value in the piezoresistor region. The temperature dependent transduction performance is the resistance change versus applied stress, $\partial R/\partial (stress)$ as a function of temperature $\partial^2 R/\partial T\partial (stress)$ or in other words, the piezoresistive stress sensitivity temperature coefficient, herein referred to and identified as the Pi temperature coefficient. Herein, Pi characteristics refers to both Pi and its temperature coefficient.

The piezoresistor performance characteristic, as said earlier, is strongly dependent on the mechanical mechanism supporting the piezoresistor, i.e. the diaphragm and constraint structure. A thermally induced stress applied to the diaphragm portion in the stress sensor substrate results from temperature changes in the piezoresistor mechanical supporting mechanism. This thermally induced stress results in a shift (SHIFT) in the piezoresistor performance characteristic with changing temperature at constant applied stress.

Advances in semiconductor fabrication technology, specifically in ion-implantation techniques, have made it possible to accurately control the dopant distribution in a resistor, both the total dopant in a pn junction isolated resistor formed in silicon, and also, the maximum dopant concentration in such a resistor. These fabrication advances allow production of piezoresistive sensors having TCR and Pi characteristics which are repeatable and reproducible from device to device so that temperature compensation schemes may be implemented. Further, making the diaphragm of silicon in the manner shown by Marshall in U.S. Pat. Nos. 4,035,823 and 4,125,823 has substantially reduced and made repeatable the thermally induced stress in the supporting mechanical structure so as to make compensation schemes practical. The above referenced patents disclose semiconductor stress sensors which have substantially device to device reproducibility and repeatable temperature characteristics through controlling the depth, or location, of, and the value of maximum dopant concentration of the resistor dopant, and through controlling the mounting of the sensor when affixed to mounts of a material type differing from the sensor material. However, many applications require improved temperature dependent transduction performance characteristics of the stress transducer system over extended temperature ranges above that which can be provided by known semiconductor stress sensor processing techniques.

As stated earlier, production of piezoresistive sensors having TCR and Pi temperature and stress characteristics, respectively, which are reproducible and repeatable from device to device make possible the use of general temperature compensation schemes to provide improved performance characteristics for the stress transducer system over the desired extended temperature ranges. Many of the compensation schemes presently known have disadvantages in that they require special components or are not easily fabricated in monolithic integrated circuit chips, or both.

SUMMARY OF THE INVENTION

The present invention provides an integrated circuit stress transducer system including signal processing circuitry responsive to signals from semiconductor stress sensors where the processing circuitry output signals are corrected for sensor stress sensitivity variations due to the semiconductor sensor stress sensitivity or Pi temperature coefficient, the sensor resistance temperature coefficient or TCR, and the SHIFT resulting from thermally induced stress. The system arrangement provides semiconductor sensors, sensor signal processing circuitry, and sensor temperature compensation circuitry for the most part in a single monolithic integrated circuit chip which can be fabricated with known monolithic integrated circuit fabricating processes at a reasonable cost. This is accomplished through using a system having multiple feedback amplifiers and additional resistors for compensation which are provided in different locations, or are formed in a different manner, than are the sensor resistors all being part of the completed monolithic integrated circuit chip structure arrangement in which structural arrangement there are both a diaphragm portion and a constraint portion.

BRIEF DESCRIPTION OF THE DRAWINGS

FIG. 1 is a schematic circuit diagram of an embodiment of the invention showing four stress sensors in a bridge circuit configuration, FIG. 3 is a graph of normalized sensor stress sensitivity (S) and signal processing circuitry electrical gain (G) as a function of temperature for the four element stress sensor bridge circuit and signal processing circuit of FIG. 1, FIGS. 4A and 4B are top and side views of a semiconductor stress sensing apparatus, FIG. 5 is a schematic circuit diagram of another embodiment of the invention showing an integrated circuit pressure transducer system with stress sensitivity temperature compensation, null compensation, and null setting networks.

DESCRIPTION OF THE PREFERRED EMBODIMENTS

A piezoresistor can be provided in a silicon diaphragm-constraint structure chip where the piezoresistor has a portion thereof in the diaphragm portion and a portion thereof in the constraint portion as described in the above referenced Marshall patents. Two piezoresistors may be provided together at one stress sensing location on the semiconductor diaphragm, or at two locations each exhibiting the maximum stress of the kind each resistor is to sense, or in some other arrangement. The piezoresistor pair is generally formed substantially concurrently in a fabrication process whereby each piezoresistor has substantially the same dopant distribution. Generally, the piezoresistor pair is formed in the diaphragm such that one of the piezoresistors has a primary response to longitudinal stress in the semiconductor material, i.e. silicon crystalline lattice, and the other has a primary response to transverse stress in the same crystalline lattice. This pair of piezoresistors are referred to as radial and tangential piezoresistors as indicated in the Marshall patents. In this type of stress sensor configuration, the material behaves such that the response of the radial piezoresistor to an applied stress is opposite that of the tangential piezoresistor; that is, as the resistance of one increases, the other decreases for a change in any commonly applied stress. Appropriate circuitry is adapted to sense the change in resistance in each member of the sensor pair to provide an output signal change twice that which would otherwise be obtained from a single sensor.

Figure 4A:
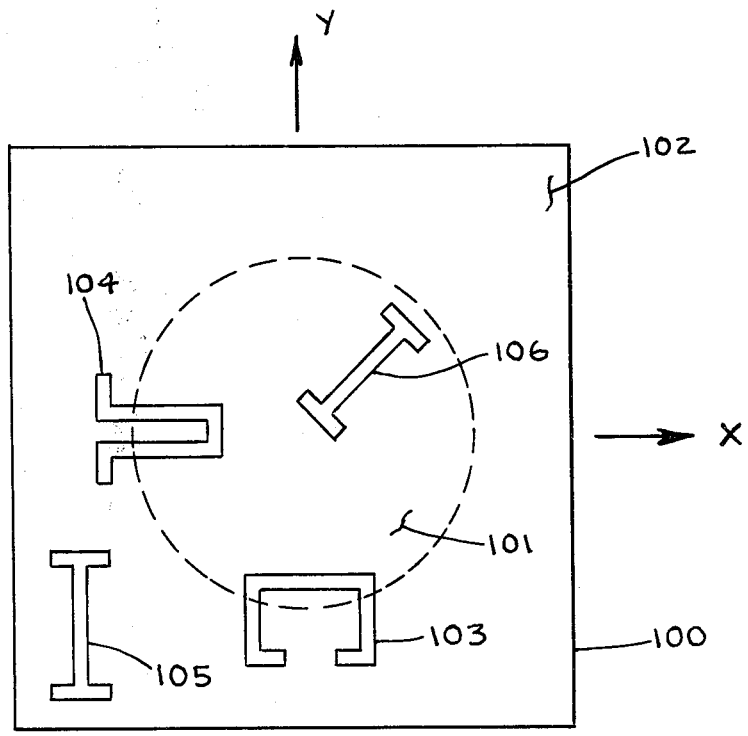
Figure 4B:
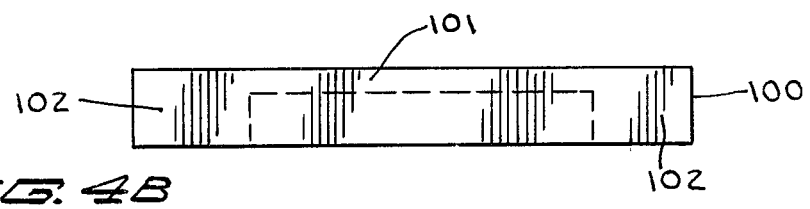
Figure 9:
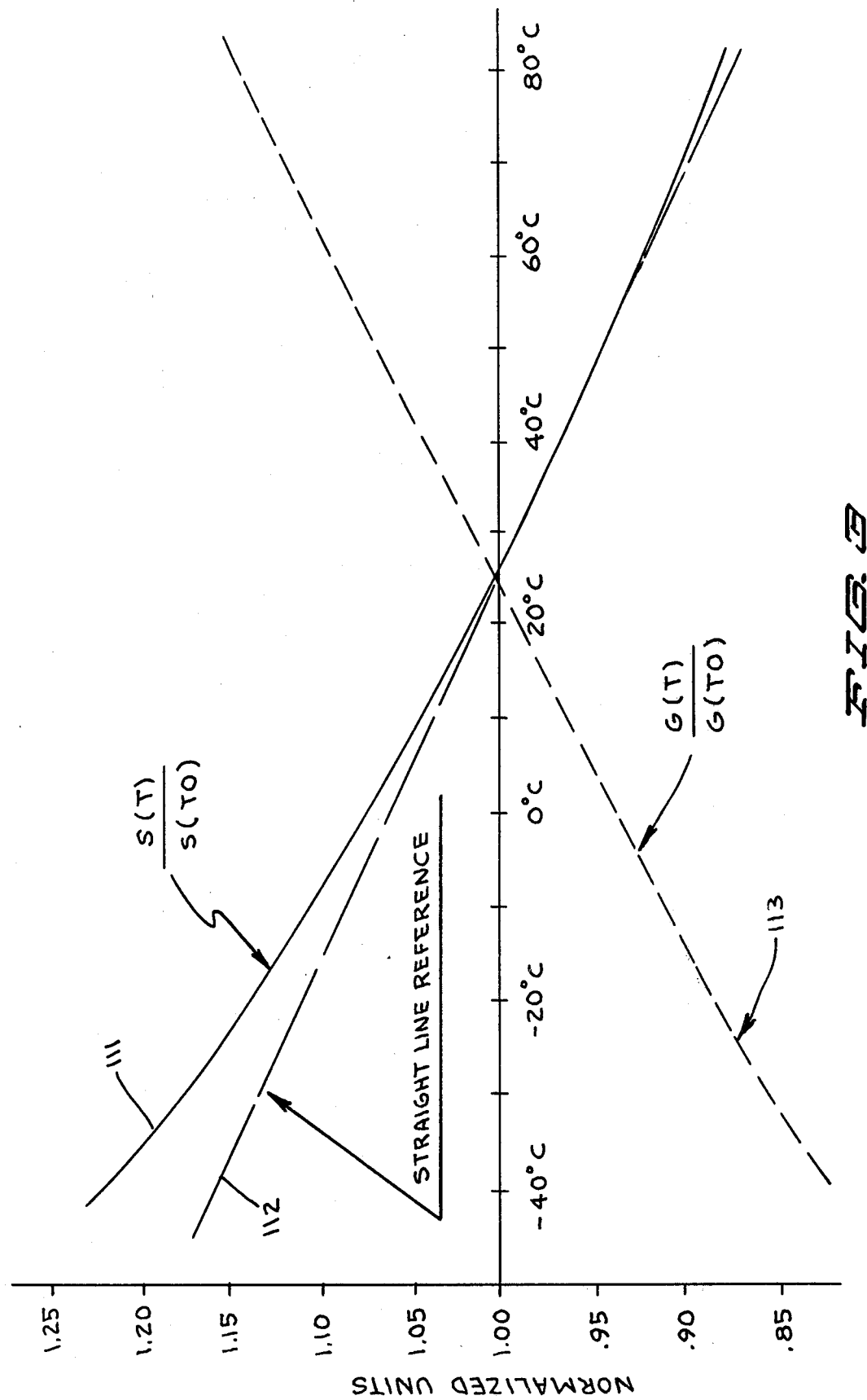

FIGS. 4A and 4B illustrate in a general sense, though not to actual layout and dimensions, a portion of a stress sensing apparatus, including stress sensing piezoresistors like those shown in U.S. Pat. No. 4,035,823 to Marshall and as described in the immediately preceding paragraph. FIGS. 4A and 4B show top and side views respectively of a stress sensing apparatus. This stress sensing apparatus comprises a semiconductor material chip, 100, of a first conductivity type, except in selected locations, interior and relatively thin semiconductor material diaphragm portion, 101, and having a constraint portion, 102, of this semiconductor continuing at the periphery of the diaphragm portion to constrain same. The diaphragm portion is the thin section of the chip structure shown in FIGS. 4A and 4B having a circular shape although the diaphragm shape need not be circular. Two resistors, 103 and 104, are shown fabricated in the semiconductor material and at least a portion of each is formed in diaphragm portion 101. These resistors are fabricated by forming a dopant distribution in the semiconductor material leading to a second and opposite conductivity type in the domain within the bounds shown for these resistors in FIG. 4A. Each of resistors 103 and 104 has the same dopant distribution therein and is of the same conductivity type. The bounds of these resistors shown by the outlines in FIG. 4A are formed by semiconductor pn junctions. Resistors 103 and 104 are oriented with respect to the crystalline structure of the monocrystalline semiconductor material so as to become stress sensitive piezoresistors each having stress versus resistance characteristics opposite the other, in the sense indicated above, with resistors 103 and 104 being oriented as tangential and radial stress sensors, respectively, with respect to the circular shaped diaphragm portion.

Also shown in FIG. 4 is a resistive element, 105, fabricated in and on, or possibly just on, constraint portion 102 of semiconductor chip 100. Resistive element 105, positioned as described, will be essentially insensitive to stress applied to the diaphragm regardless of the orientation of element 105 with respect to the chip semiconductor material crystalline structure. Resistive element 105, and other resistive elements positioned in constraint portion 102, may have the domains within the semiconductor pn junctions bounding each of them fabricated in the same fabrication process steps leading to piezoresistive devices 103 and 104 to form further circuit components in the transducer system. Specifically, resistive element 105 may be, for example, a resistor formed in the semiconductor material by the same process steps as are piezoresistive sensors 103 and 104 to thereby substantially have the same conductivity type and the same dopant distribution as to each of sensors 103 and 104. Also possible would be using essentially the same process steps to form resistive element 105 as are used to form sensors 103 and 104 but with a few alterations to permit providing a somewhat different dopant distribution for resistive element 105. On the other hand, element 105 and other similarly used resistive elements may, again by example, have the resistive domain of each formed by thin film resistors deposited on the chip, or on an insulating layer over or in some part of the chip, since thin film resistors can be fabricated on such a chip which are generally insensitive to stress.

Further shown in FIG. 4 is a resistive element, 106, fabricated in the semiconductor material forming diaphragm portion 101 and being oriented with respect to the crystalline structure of this semiconductor material in a manner so as to be insensitive to stress. Although resistor 106 is shown entirely in the diaphragm portion of the substrate, a portion of resistor 106 could also be located in constraint portion 102, while still being oriented to be insensitive to stress. Resistor 106 is shown in FIG. 4 as being oriented at an angle of 45 degrees to the indicated X-axis and Y-axis respectively. Resistor 106, like resistor 105, may again have the same conductivity type and the same dopant distribution, or alternately a different dopant distribution, within the domain thereof bounded by its semiconductor pn junction as do resistors 103 and 104. Again, element 106 could in the alternative be a thin film resistor domain oriented in any direction on diaphragm portion 101 since such a resistor type can be formed generally insensitive to stress.

Thus, it is possible to fabricate resistors substantially insensitive to stress in and on, or possibly just on, the same semiconductor diaphragm-constraint structure chip as are stress sensors 103 and 104. Further, it is possible to fabricate both the stress sensors, i.e. stress sensitive resistors, and the stress insensitive resistors using common fabrication process steps resulting in all such similarly fabricated resistors having substantially the same conductivity type and dopant distribution. One such fabrication technique is the ion-implantation technique using a common ion dose to form both stress sensitive and stress insensitive resistors resulting in these stress insensitive resistors and stress sensors having a common conductivity type and substantially the same dopant distribution.

As is well known in the art, the use of two pairs of the radial and tangential stress sensors (each similar to that shown in FIG. 4) connected in a four-element bridge sensor configuration in the diaphragm portion of a semiconductor diaphragm-constraint structure chip provides a signal change to subsequent signal processing circuitry, in response to a stress applied to the chip diaphragm, which is double that provided by one pair of piezoresistors in such a chip to the same applied stress.

Figure 6:
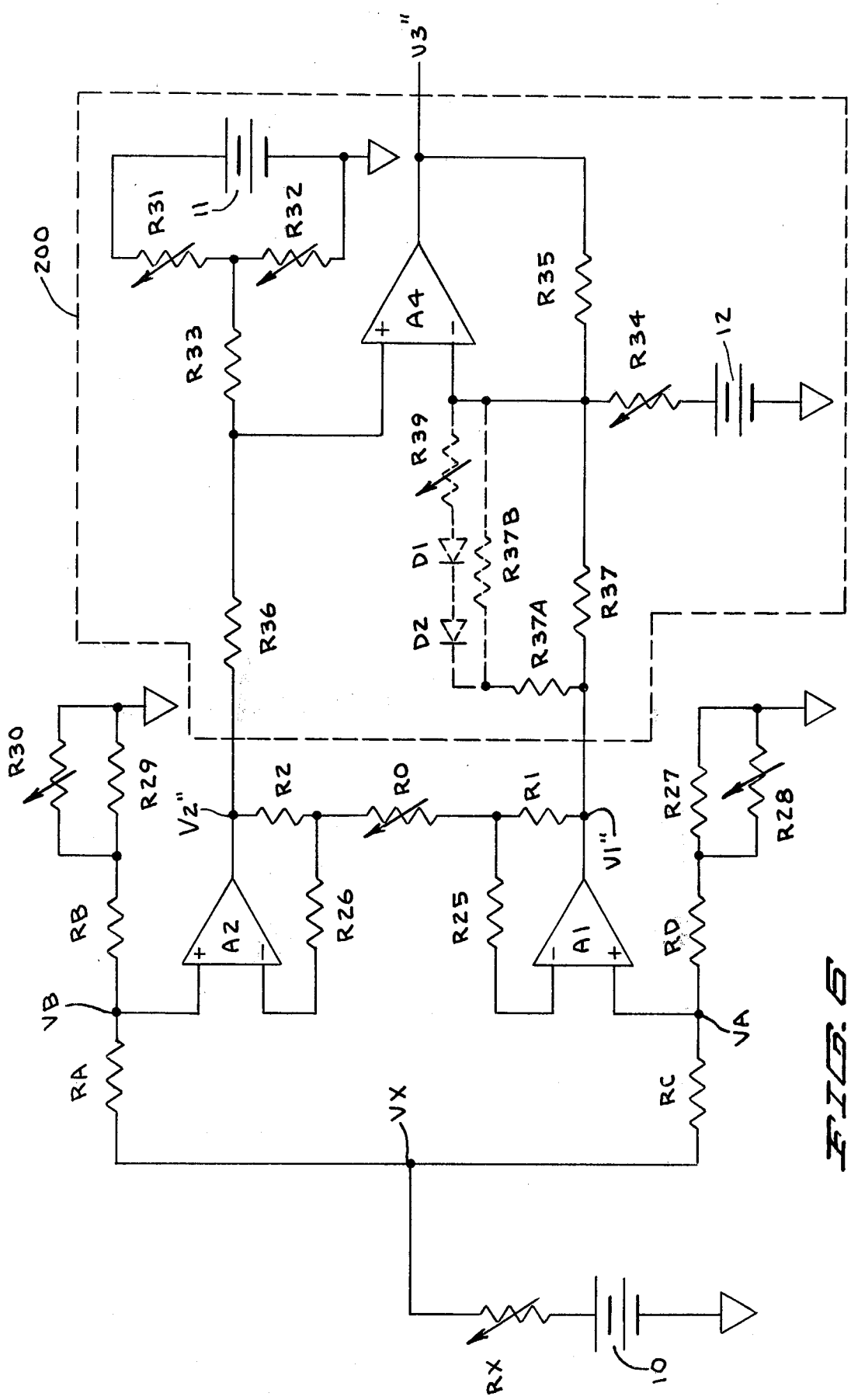
FIG. 6 is a schematic circuit diagram of another embodiment of the invention showing an alternate version of the null compensation and the null setting networks to that shown in FIG. 5.

The transducer system circuit diagrams shown in FIGS. 1, 5, and 6 each present four semiconductor stress sensing elements, i.e. piezoresistors, RA, RB, RC, and RD, connected in the same bridge configuration. A description of the bridge circuit shown in FIG. 1 will suffice to explain the operation of the bridge circuits shown in FIGS. 5 and 6 also. Resistors RA and RB in FIG. 1 are connected in series and are tangential and radial piezoresistive sensors, respectively, located in the diaphragm portion of a silicon diaphragm-constraint structure chip with each having an opposite response with respect to the other upon encountering a commonly applied stress to this diaphragm portion as indicated above. The interconnection point of resistors RA and RB will have a voltage value designated VB. Resistors RC and RD are also located in the diaphragm portion of the chip and connected in series, and are radial and tangential piezoresistive sensors, respectively. The interconnection point of resistors RC and RD will have a voltage value designated VA. The tangential and radial sensors within both series pairs shown in FIG. 1 can, of course, be interchanged in circuit component position in the bridge circuit while remaining in the same geometrical locations in the diaphragm portion. In doing so, the polarity of the bridge output signal would be reversed.

Another point of interconnection of these resistor pairs, the interconnection of resistors RA and RC, is adapted to be connected to a source of excitation voltage, 10, having a value V0. Source 10, though shown with a battery symbol, may well be some other common source of constant polarity voltage. The interconnection point of resistors RA and RC will have a voltage value designated VX. Finally, the interconnection point of resistors RB and RD is connected to the circuit zero reference voltage, i.e. ground. The bridge output signal voltages in FIG. 1, taken between the interconnection point of resistors RA and RB, on the one hand, and the interconnection point of resistors RC and RD on the other, are therefore voltages VA and VB. The output signal voltage indication from the bridge circuit chosen for further signal processing because it represents the largest bridge output signal available indicating the stress applied to the chip diaphragm is the difference in value of each of these voltages VA and VB, and so the bridge output signal voltage indicating the applied stress which signal is to be provided to the transducer system signal processing circuitry will be expressed as VB-VA. A further bridge output signal voltage indication of some use in the signal processing circuitry, as will be shown later, is expressed VB+VA. The sensitivity of the bridge output signal voltage VB-VA to changes in stress applied to the diaphragm portion is, of course, dependent upon the stress sensitivity to such stress changes in the individual sensors or piezoresistors forming the bridge circuit, and also to the value of voltage applied to the bridge, VX, which depends on the value VO of source voltage 10.

In an alternative form of FIG. 1, a resistor RX shown as a dashed line component may be provided between source 10 and the interconnection point of resistors RA and RC. In this situation, as will be discussed later, the voltage applied to the bridge, VX, will be dependent upon the value of source voltage 10 and the ratio of resistor RX and the effective impedance of the bridge piezoresistors RA and RB in parallel with piezoresistors RC and RD. The resistance value of RX will be taken to be zero in the following until stated otherwise.

Since the resistance versus stress characteristic of sensors RA and RB are oppositely going, the change in voltage in response to a stress applied to the diaphragm portion of the chip at the circuit point VA will be twice that if only a single sensor was used as previously indicated which could be accomplished in the circuit of FIG. 1 by having constructed the chip so that only resistor RA was sensitive to stress while resistors RB, RC, and RD were not. When the sensor bridge is configured as already described, the output signal voltages VA and VB are also oppositely acting in response to a stress applied to the chip diaphragm. Thus the change in voltage VB-VA to such an applied stress will be twice that if only a single pair of sensors, e.g., RA and RB, were used or made stress sensitive in constructing the chip as indicated above. Having resistors RA and RB sensitive to stress would be equivalent to resistors RC and RD being constructed in the chip to be stress independent resistors, i.e. making voltage VA constant with respect to stress. Whether one uses a single sensor, a single pair of sensors, or two sensor pairs is a matter of choice, and would not alter the circuit principles discussed in connection with the signal processing circuitry in the following. Only the bridge output voltage magnitude to be supplied to the subsequent signal processing circuitry will differ for a given applied stress in choosing to use one or another of these sensor configurations. The following description is arbitrarily based on use of two pairs of piezoresistive sensors connected in a bridge circuit.

As discussed above, each of the semiconductor piezoresistive sensors, RA, RB, RC, and RD, have both a temperature coefficient of resistance or TCR, and also a piezoresistive stress sensitivity temperature coefficient or Pi temperature coefficient, with each of these coefficients depending primarily on the maximum dopant concentration occurring in the semiconductor material in the chip diaphragm region forming the piezoresistive sensor.

When the maximum dopant concentration of the piezoresistive sensor region in the semiconductor material is in the range of $10^{17}$ to $10^{20}$ atom/cm$^3$, the sensor exhibits reasonably good stress sensitivity, and further exhibits conveniently useful TCR and Pi characteristics. In this range of dopant concentration, the TCR value changes strongly with changes in the maximum dopant concentration, whereas the Pi characteristic is not significantly affected for the same changes in the maximum dopant concentration. Thus, the TCR of the piezoresistive sensor can be varied by selecting a particular dopant concentration while the Pi characteristic will remain relatively constant in the dopant concentration range indicated.

The dopant distribution, including the maximum dopant concentration within the sensors, may readily be controlled in fabricating each integrated circuit transducer chip so that any multiple sensors therein, i.e. piezoresistors RA, RB RC, and RD in FIG. 1, can be provided having matched and substantially equal TCR and Pi characteristics. Such excellent control of the maximum dopant concentration can be achieved by use of ion implantation methods during fabrication.

Consider the effects of temperature in the bridge circuit shown in FIG. 1 assuming piezoresistors RA and RB have matched temperature coefficients of resistance, i.e. matched TCR's, and the Pi temperature coefficient of each is zero. The resultant ratio of resistance values for piezoresistors RA and RB for a constant applied stress will remain constant for varying temperatures. Thus, the output voltage VB, which depends on the ratio of resistance values of RA and RB because of the voltage divider arrangement thereof, will be substantially temperature independent if the Pi temperature coefficient is zero. Similarly, if RC and RD have matched temperature coefficients of resistance and each has a zero Pi temperature coefficient, the voltage VA will also be substantially temperature independent. With the TCR matched to one another for each of RA and RB, and for each of RC and RD, the sensor bridge output voltages VA and VB, and therefore the output expressions VB-VA and VB+VA, will remain nearly temperature independent even though each sensor individually has a TCR.

The use of a bridge sensor configuration will not eliminate the effects of temperature in the bridge due to the Pi temperature coefficient, as it does for TCR, because the radial and tangential piezoresistive sensor responses are oppositely acting. However, as indicated earlier, it is possible to accurately control the maximum dopant concentration for a multiplicity of sensors in each diaphragm portion of a silicon diaphragm-constraint structure chip such that the diaphragm to diaphragm (i.e. piezoresistor to piezoresistor for similarly located piezoresistors in each diaphragm in successive chips) variation in the Pi characteristics over temperature and over stress between each similarly located individual sensor is very small. The repeatability of the Pi temperature coefficient form, diaphragm to diaphragm, i.e. chip to chip, allows the effects of the Pi temperature coefficient to be compensated by the same circuit compensation schemes for each chip, i.e. transducing system. Thus, for a given sensor structure configuration forming in a chip a four-element stress sensor bridge circuit as shown in FIG. 1, and a given process for fabricating this chip so arranged, the output voltage signal expression for such a bridge circuit, VB-VA, as a function of stress, will have a distinctive stress sensitivity temperature characteristic which will be substantially reproducible and repeatable in each chip having this bridge system made by this process with sensors, or piezoresistors, of this configuration.

Figure 2:
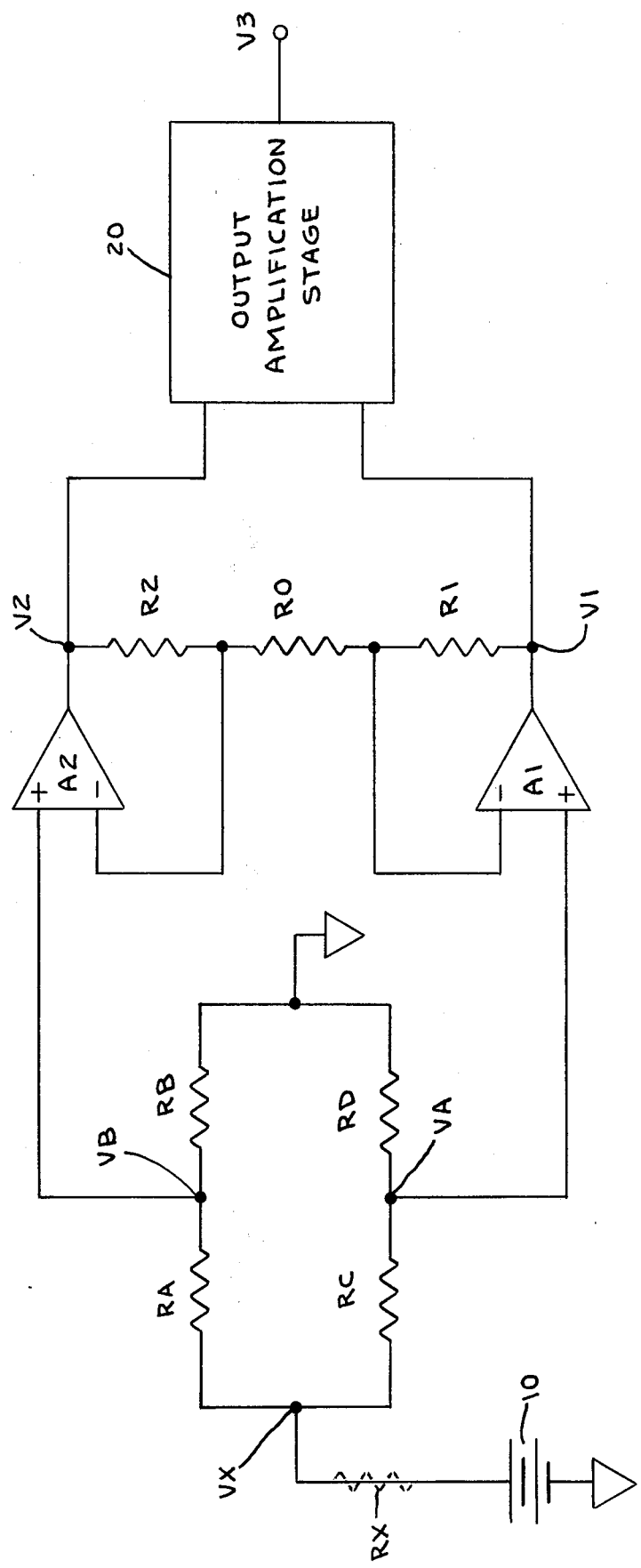
FIG. 2 is a graph of output voltage versus stress for several temperatures for the four element sensor bridge of FIG. 1.
Figure 2:
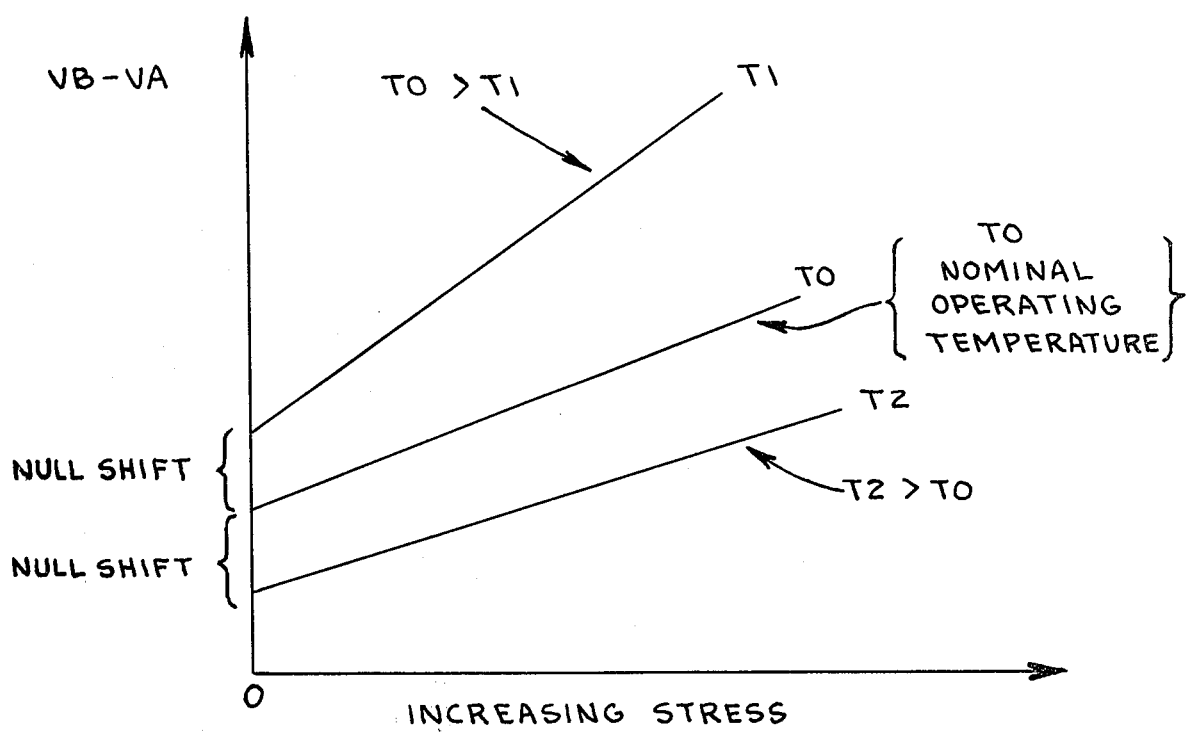

Shown in FIG. 2 is a typical bridge output signal voltage characteristic, presenting VB-VA versus stress for the four-element piezoresistive sensor bridge system shown in FIG. 1. Bridge system responses to stress applied to the chip diaphragm each of differing temperatures T0, T1, and T2 are shown. Two effects are observed:

(1) Each graph of bridge output signal voltage expression VB-VA versus stress applied to the chip diaphragm at a constant temperature exhibits a different slops for each constant temperature $T_0$, $T_1$, and $T_2$. The slope is a measure of the stress sensitivity of the bridge sensor system, i.e. the change in the bridge output voltage expression VB-VA obtained for a change in applied stress. The resulting changes in slope for a varying temperature is indicative of the stress sensor Pi temperature coefficient. Typically, the stress sensitivity, Pi, is inversely related to temperature, i.e. the colder the temperature the greater the stress sensitivity, as shown in FIG. 2.

(2) The stress sensor bridge output voltage, signal expression, VB-VA, varies with temperature with a constant applied stress. This effect is thought to be related to the combined effects of thermally induced stress in the diaphragm resulting from the piezoresistor's supporting structure leading to SHIFT in the bridge output expression VB-VA, and of the piezoresistive Pi characteristic. As shown in FIG. 2, a positive voltage variance in VB-VA is seen with a decrease in temperature, and a negative voltage variance for an increase in temperature. Typically, the magnitude of the voltage variance in VB-VA is greater changing to a colder temperature from a reference temperature than changing to a warmer temperature from the same reference temperature for equal temperature changes. However, different variances, even occurring in opposite directions, may be seen in different sensor structures.

Usually, the temperature related variance in the stress sensor bridge system output voltage signal expression VB-VA is determined with a "zero pressure" input applied externally to the sensor diaphragm. The "zero pressure" variance in VB-VA is usually defined as the "null shift", and is just that due to thermally induced stress which was indicated above to be also designated SHIFT. Another pressure basis could be used, but note that at any other pressure input, the variance cannot be resolved into that part caused by differences in the Pi temperature coefficient and that part caused by thermally induced stress. Also note that included in the measured null Shift are any contributions to the variance in VB-VA caused by mismatch in the TCR's of the bridge sensors, although typically this contribution is very small.

Thus, to provide precision stress transducer systems using the bridge circuit of FIG. 1, compensation circuitry must be provided capable of permitting both temperature compensation of the stress sensor sensitivity and also temperature compensation of the stress sensor bridge output voltage null shift. Further, linearity compensation schemes to render the bridge sensor system characteristics more nearly linear with temperature may also be required in some applications depending on the precision required.

In the stress transducer system circuit diagram of FIG. 1, the sensor bridge circuit is connected to a balanced, dual-amplifier stage, as part of the signal processing circuit, which includes two operational amplifiers, A1 and A2, each of which has an input upon which impressing an electrical signal voltage leads to an output signal which is an inverted and scaled version of the signal impressed on that input thereof, and an input associated with a non-inverted, scaled output result. Each of amplifiers A1 and A2 has the typical operational amplifier characteristics of high gain, high input impedance, low output impedance, and each has sufficiently small input offset voltages and currents and a sufficiently large output voltage slew rate capability. Each of operational amplifiers A1 and A2 makes use of two sources of constant polarity voltage of different voltage values to operate but such sources and the interconnections required are not shown in FIG. 2 for amplifiers A1 and A2. A suitable operational amplifier is described in a patent application having Ser. No. 208,359, filed Nov. 19, 1980, entitled "Integrated Circuit Amplifier" by R. Muir and assigned to the same assignee as the present application. The interconnection point of piezoresistive sensors RC and RD, which presents bridge sensor system output voltage VA, is connected to the noninverting input of amplifier A1. The interconnection point of piezoresistor sensors RA and RB, which presents bridge sensor system output voltage VB, is connected to the noninverting input of amplifier A2.

The output of amplifier A1, which provides an output voltage designated V1, is connected back to its inverting input through a resistor, R1; the output of amplifier of A2, which provides an output voltage designated V2, is connected back to its inverting input through another resistor, R2. Connected between the inverting inputs of amplifiers A1 and A2 is a further resistor, R0. Amplifiers A1 and A2 with resistors R0, R1, and R2 together form a first amplification stage, and this stage provides amplification of the bridge system output voltage signal expression, VB−VA, while passing any common mode voltage appearing at the bridge circuit inputs to A1 and A2 at unity gain. The first amplification stage also presents a high input impedance to the voltage signal VB−VA from the bridge system.

Also shown in FIG. 1, the output signals of the first stage of amplification, output voltages V1 and V2 from amplifiers A1 and A2, respectively, are provided directly to the inputs of a second, or output, amplification stage, 20, which can also be viewed as an output transformation stage for converting the first stage differential signal to a single signal with respect to a reference voltage, here being ground. Output amplification stage 20, for the present description, is a unity gain amplifier stage which provides an output voltage designated V3. Output amplification stage 20 need not be a unity gain amplifier. However, if the dual amplifier stage provides all of the gain and the output stage is a unity gain amplifier, the amplification system as presented in FIG. 1 will minimize the possible errors introduced by input offset voltage drift and other such signal processing circuitry errors.

The output amplification stage 20 amplifies having unity gain in this description the voltage expression V2−V1, which is the amplified version of VB−VA, to provide the output voltage V3. An expression for the output voltage V3, the bridge circuit-amplification system output voltage, as a function of the bridge system output voltage signal expression VB−VA can be found from well known analysis techniques to be as follows for the circuit of FIG. 1:

$$V3 = (V2\text{-}V1) \times (\text{unity gain}) = \quad (1)$$

$$(VB\text{-}VA) \times G \times (1) = (VB\text{-}VA) \times G$$

where $G \triangleq 1 + \frac{R1 + R2}{R0}$

The amplifier system gain G in equation (1) is the gain of the balanced dual-amplifier based first amplification stage, including operational amplifiers A1 and A2, times the gain of the output stage which is just one.

The sensitivity of the stress transducer system, i.e. the change in output voltage V3 for a change in input stress, may be found from the foregoing equation through differentiation thereof as the change in bridge system output voltage signal expression VB−VA for a change in stress times the amplifier system gain as is shown in mathematical form in equation (2) assuming the resistance values of R0, R1, and R2 do not depend on stress:

$$\frac{\partial V3}{\partial (\text{stress})} = S(T) \times G \quad (2)$$

where $S(T) \triangleq \frac{\partial (VB\text{-}VA)}{\partial (\text{stress})}$ In equation (2), S(T) is the temperature dependent stress sensitivity of the stress sensor bridge system which is a function of the individual piezoresistive sensor characteristics, and bridge excitation voltage 10 of value V0.

The bridge system stress sensitivity S(T) is sometimes expressed in terms of SPAN which is the algebraic difference between the resultant voltage VB−VA at some selected stress value in the upper range of stress values and some selected stress value in the lower range of stress value, usually zero. S(T) is equivalent to SPAN for bridge circuit characteristics in which VB−VA is a linear function of applied stress; otherwise, SPAN represents some averaging of the slope of the bridge circuit characteristic. For purposes of the discussion herein, S(T) and SPAN(T) are equivalent.

Because the VB−VA response of the bridge system to a change in stress is dependent upon temperature due to the Pi temperature coefficient of the individual sensors in the bridge, the response of the output voltage V3 to a change in applied stress is also dependent upon temperature. Compensation for temperature variations in the stress sensor bridge system sensitivity S(T) caused by the piezoresistive stress sensitivity temperature coefficient may be provided by making the gain, G, temperature sensitive in a sense opposite to that of S(T) such that the response of the output voltage V3 to a change in applied stress becomes independent of temperature. For ideal temperature compensation, the gain G(T) at any temperature multiplied by the bridge system stress sensitivity S(T) must equal a constant, i.e. ∂V3/∂(stress) must equal a constant which can be termed the system stress sensitivity as V3 is desired to be a linear function of stress independent of temperature. The constant for ∂V3/∂(stress) is chosen typically to be the product of the desired nominal operation stress sensitivity and the gain both at the nominal operating temperature T0 which will provide the desired change in value of V3 for a given change in applied stress, i.e. the system stress sensitivity.

To mathematically illustrate this concept, equation (2) is first rewritten to make the temperature dependence with G explicit; the dependence of G on temperature will not lead to any change in form of equation (2) since the differentiation of equation (1) in deriving equation (2) was not made with respect to temperature.

$$\frac{\partial V3}{\partial \text{(stress)}} = S(T) \times G(T) = S(T0) \times G(T0) = \text{constant} \qquad (3)$$

This equation may then be rewritten as follows:

$$G(T) = \frac{G(T0) \times S(T0)}{S(T)} \qquad (4)$$

G(T0) and S(T0) are gain and sensitivity, respectively, at a selected nominal temperature T0.

Equation (4) indicates that for ideal temperature compensation G(T) must be inversely proportional to S(T). Sensor bridge stress sensitivity as a function of temperature S(T) may be found from empirical data.

Hence, temperature compensation of the bridge sensitivity can be accomplished by making amplifier system gain G temperature sensitive. For simplicity, gain G(T) is considered to be substantially insensitive to stress for the temperature compensation scheme in the following discussion, although this is not necessarily required, and a stress sensitive gain could be utilized in some situations. Gain G(T) as described in equation (4) may be made temperature sensitive by controlling either individually, or in combination, the temperature sensitivities of resistors R1, R2, and R0, that is, the temperature coefficients of resistance or the TCR's of these resistors. Gain G can be made to have a positive temperature coefficient by making resistors R1 and R2 more sensitive to temperature in a positive direction than is resistor R0 as is made clear by the equation for G below equation (1). On the other hand, gain G can be made to have a negative temperature coefficient by making resistors R1 and R2 less sensitive to temperature in the positive direction than resistor R0. If these resistors have negative temperature coefficients instead, the effect on the temperature coefficient of gain G(T) will be reversed. Of course, various combinations of positive and negative temperature coefficients for resistors R0, R1, and R2 could provide either a positive or negative gain G(T) temperature coefficient.

Equation (4) shows that the gain temperature characteristic must be substantially the inverse of bridge stress sensitivity temperature characteristic S(T). As will be shown below, if gain G(T) has a sufficient positive temperature coefficient, the bridge system sensitivity S(T) will be effectively temperature compensated. For discussion purposes, resistors R0, R1, and R2 are assumed below to have positive temperature coefficients of resistance. Further, resistors R1 and R2 are assumed to be more sensitive to temperature than resistor R0, and have substantially identical temperature coefficients, thus providing G(T) with a positive temperature coefficient as can be seen from the equation for G below equation (1). Taking the immediately preceding assumption further, assume that resistor R0 is substantially insensitive to temperature.

These assumptions can be put into actual practice by use of resistors formed in the semiconductor material for resistors R0, R1, and R2 because the resulting positive temperature coefficients thereof can be controlled by controlling the maximum dopant concentration therein provided during fabrication in just the same manner as indicated for the piezoresistors above. Resistors R0, R1, and R2 may be made substantially insensitive to stress, for example, by locating them in a manner as described above with reference to resistors 105 and 106 in FIG. 4. R0 can also be made substantially insensitive to temperature, i.e. have a very low TCR, by having a relatively high dopant level on the order of $10^{19}$ impurity atoms/cm$^3$. While R1 and R2 can be set to each have a higher TCR through using a low dopant level on the order of $10^{17}$–$10^{19}$ impurity atoms/cm$^3$. Assuming that R1 and R2 are fabricated to each have a positive temperature coefficient of resistance, or TCR, equal to the other, and designating such a TCR as Q, then gain G as a function of temperature about the selected temperature T0 may be expressed to first order by the use of a truncated Taylor expansion series as is shown in equation (5):

$$G(T) = G(T0) + K \times G(T0) \times (T-T0) \qquad (5)$$

where $G(T0) \triangleq 1 + \frac{R1(T0) + R2(T0)}{R0}$ and $$K \triangleq Q \times \frac{1}{1 + \frac{R0}{R1(T0) + R2(T0)}}$$

G(T0) is the amplifier system gain at the selected nominal temperature, and K is the effective temperature coefficient of amplifier system gain G(T) with Q, as indicated, equal to the TCR of resistors R1 and R2. R0 in equation (5) is considered to be substantially temperature independent.

Shown in FIG. 3 is a normalized stress sensitivity characteristic S(T)/S(T0), designated 111, normalized about T0 (shown as 25° C.) for a typical piezoresistive sensor bridge system as described in connection with FIG. 1 with each sensor fabricated in the diaphragm portion of a silicon diaphragm-constraint structure chip in a structural configuration in accordance with the above-referenced Marshall patents. Also shown for comparison is a straight line reference 112 showing the S(T)/S(T0) characteristic, 111, to be somewhat nonlinear. The stress sensor bridge sensitivity temperature coefficient is shown in FIG. 3 to be negative, i.e. as the temperature decreases, the stress sensitivity increases. Span temperature compensation can be provided by making G(T) have a positive temperature coefficient, i.e. as the temperature decreases, gain G(T) decreases. G(T) is provided with a positive temperature coefficient as indicated above by making resistors R1 or R2 or both have a positive temperature coefficient (TCR) so that amplifier system gain temperature coefficient K as described in equation (6) is positive. Shown in FIG. 3 by the curve designated 113 is the approximate normalized electrical gain characteristic G(T)/G(T0) of the amplifier system first stage and the output stage together as shown in FIG. 1 which characteristic can be seen to have a positive gain temperature coefficient and to be approximately the inverse of curve 111.

In the invention of the present application, resistors R1 and R2 of the first amplification stage are fabricated in the constraint portion of the silicon diaphragm-constraint structure chip as part of the monolithic integrated circuit being formed in this chip concurrently in the same fabrication process as are piezoresistive resistors sensors RA, RB, RC, and RD, these sensors being fabricated in the diaphragm portion of the chip. Alternately, resistors R1 and R2 may be fabricated in the diaphragm portion of the monolithic integrated circuit chip having the diaphragm-constraint arrangement, the resistors being appropriately oriented with respect to the crystalline structure of the silicon material so as to be substantially insensitive to stress, and these resistors being fabricated by the same fabrication process as are piezoresistors RA, RB, RC, and RD as indicated above.

The silicon diaphragm-constraint structure chip thus provides the semiconductor material base for forming the single monolithic integrated circuit shown in FIG. 1. The circuit components, both in the diaphragm and in the constraint portions, are formed near or on, or both near and on, a major surface of the silicon chip. Resistors R1 and R2 are formed concurrently with, and so have the same impurity dopant distribution as, the piezoresistive stress sensors RA, RB, RC, and RD. This manner of fabricating the piezoresistor means they also must have a positive TCR if resistors R1 and R2 are fabricated having a positive TCR as required of them for effecting compensation as indicated above. Resistors R1 and R2 may be oriented in any convenient manner with respect to the silicon lattice planes in a manner as described with reference to resistor 105 in FIG. 4 if placed in the constraint portion, and so may exhibit piezoresistance, or alternatively may be oriented in a specific manner as described with reference to resistor 106 in FIG. 4 if placed in the diaphragm portion.

The preferred manner of fabricating semiconductor piezoresistive stress sensors RA, RB, RC, and RD is through the ion-implantation process. As described earlier, these piezoresistors are provided, at least in part, in the diaphragm portion of the chip supported by a constraint portion in the chip. If a piezoresistor is located in the constraint portion only as opposed to being in any way in the diaphragm portion, such as R1 and R2, such a piezoresistor will be substantially isolated from an applied stress and will not exhibit a significant response to stress applied to the diaphragm portion. As noted earlier, the TCR is for any of the commonly formed piezoresistors, primarily related to the maximum impurity dopant concentration (impurity atoms/cm$^3$) supplied by the ion-implant impurity does (ion/cm$^2$). Thus, a temperature sensitive resistor having a selected TCR and being substantially insensitive to stress can be provided in and on the silicon diaphragm-constraint structure chip along with the piezoresistive resistor sensors concurrently in the same fabrication process to form a monolithic integrated circuit in that chip.

Note that in the above circuit analysis of FIG. 1, the TCR designated Q of resistors R1 and R2 was assumed to be constant with temperature resulting in G(T) being substantially linear with temperature as can be seen from the equation G below equation (1). When resistors R1 and R2 are semiconductor resistors as just described, i.e. having an impurity concentration, the TCR is somewhat dependent on temperature resulting in G(T) being somewhat nonlinear. This, of course, may not always be true as advances in technology occur.

A set of characteristics of G(T)/G(T0) and S(T1)/S(T0) were determined for different impurity concentrations, each sensor RA, RB, RC, and RD and resistors R1 and R2 having substantially an identical dopant distribution. Analysis of these characteristics showed that there existed a range of impurity concentrations which substantially satisfied equation (4), i.e. G(T)/G(T0) being inversely proportional to S(T)/S(T0). As indicated earlier, it was noted that in an impurity concentration range of $10^{17}$ to $10^{20}$ atoms/cm$^3$ that S(T)/S(T0) remains substantially constant with changes in impurity concentration. However, G(T)/G(T0) in the same impurity concentration range exhibits both a change in the average TCR as well as the temperature characteristic with changes in concentration. Thus, there exists a range of impurity concentrations which result in bridge stress sensitivity (SPAN) temperature compensation. Further, there exists a common dopant distribution, i.e. impurity concentration, that can be selected to provide piezoresistive stress sensors RA, RB, RC, and RD with adequate stress sensitivity, and also provide resistors R1 and R2 as piezoresistors having a TCR temperature characteristic which compensates the piezoresistive sensor bridge stress sensitivity temperature coefficient.

Excellent results have been achieved by ion-implantation of boron ions having a selected dosage in a range of $10^{13}$–$10^{14}$ ions/cm$^2$ with an energizing source of 300 Kev. to form piezoresistors RA, RB, RC, RD, and R1 and R2. The values of resistance for the piezoresistors RA, RB, RC, and RD and for the gain control resistors R1 and R2 were all chosen to be in the order of 10 Kohms. Resistor R0 was also fabricated in the same integrated circuit chip as the stress sensors in the form of a diffused resistor, diffused into the chip semiconductor material concurrently with the diffusion of bases for the bipolar transistors in the amplifiers into the same material, with R0 having a substantially lower TCR than the piezoresistors R1 and R2, and having a resistance value in a range of 0.5–1.0 Kohms.

As described by equation (1), the transducer output voltage V3 is proportional to the amplifier system gain G which is inversely related to the value of resistance R0. Thus, resistance R0 can be selected to provide the transducer with a selected output voltage V3 sensitivity to stress, $\partial V3/\partial(stress)$. As discussed earlier, in order to provide gain G with a positive temperature coefficient, the TCR of resistance R0 must be less than the effective TCR of the sum of resistors R1 or R2.

There are various other methods of fabricating resistor R0 of FIG. 1 for the integrated circuit to be formed in connection with the silicon diaphragm-constraint structure chip having sufficiently low TCR characteristics to be less than the effective TCR of the sum of resistors R1 and R2, and which can also be adjusted in resistance value after initial fabrication to thereby adjust gain G. One method of fabricating R0 in an integrated circuit is the use of chrome-silicon resistors based on thin film technology. Chrome-silicon thin film resistors are capable of having a TCR less than 200 ppm (parts per million), i.e. less than 0.02%. Such resistors are capable of adjustment by laser trimming, either a manually or a computer controlled laser trimmer. Resistor R0 could also be provided by a network of parallel branches each containing a base diffused resistor. Adjustment can be provided thereof by either laser or abrasive cutting open selected parallel branches resulting in an increased value of R0. As is common to both of the above methods of providing adjustable resistor R0, the effective resistor can only be increased in resistance value. In some instances, it may be desirable to provide an adjustable resistor which can be incrementally decreased in resistance value.

One technique of providing a resistance between two points in an integrated circuit that can be decreased from a large resistance value to a smaller one is to provide a number of parallel circuit branches in the semiconductor material connected between each of these points. One circuit branch contains a diffused or ion-implanted resistor of a resistance value clearly larger than the resistance value ultimately desired between the two points. The remaining circuit branches each comprising a diffused or ion-implanted resistor in series with a pn junction diode, the diodes being reversed biased. The resistors in these branches are also of a resistance value larger than the ultimately desired value between the two points. A high voltage or a laser beam is applied to selected diodes to electrically short the diodes. A resistor is thereby added in parallel between the two points for each diode so rendered a short circuit to cause the effective resistance between the two points to decrease.

Whatever method is used for fabricating resistor R0, resistors or resistor networks therefor may be located in and on, or just on, the silicon diaphragm-constraint structure chip in and on which the circuit of FIG. 1 is fabricated in a manner already described with reference to resistors 105 and 106 in FIG. 4. Of course, chrome silicon thin film resistors will always be substantially insensitive to stress since they do not exhibit any significant stress response characteristics unlike semi-conductors which exhibit significant piezoresistive effects as heretofore indicated.

As indicated earlier and shown in FIG. 3, the stress sensitivity of the stress sensor bridge system of the circuit of FIG. 1 as a function of temperature is nonlinear. The sensor for the most part has been found to be more sensitive to stress at the colder temperatures than at the warmer temperatures as indicated by the normalized sensitivity curve 111 and the straight line reference 112 in FIG. 3. Typically, the TCR of each of the temperature sensitivity gain resistors R1 and R2 at temperature T0 is chosen so that the compensation they provide in the FIG. 1 circuit will be the best "average" compensation for the nonlinear bridge circuit stress sensitivity temperature coefficient. Note that linear gain temperature coefficient K in equation (5) for G(T), if made positive, compensates a nonlinear S(T) characteristic according to equation (3) for an S(T) characteristic which increases with decreasing temperature as it does in FIG. 3.

As described above, proper selection of ion dosage in the making of resistors R1 and R2 will yield good temperature compensation of the stress sensors in the configuration described with reference to FIG. 1. However, given the nature of the output signal expression of the sensor bridge versus applied stress, or the stress sensor bridge system sensitivity S(T), in being nonlinear with temperature as shown above in FIG. 3, even the essentially best average temperature compensation provided by temperature sensitive gain setting resistors R1 and R2 may still result in the magnitudes of deviation of the overall system stress sensitivity at opposite temperature extremes from the system stress sensitivity at T0 extrapolated to the extremes being generally different at such opposite temperature extremes. This can be seen by noting the differing gaps between curve 111 for the normalized bridge system sensitivity and line 112 for the extrapolated normalized bridge system sensitivity in FIG. 3 at the temperature extremes of the temperature range over which curve 111 and line 112 extend.

In some transducer applications, the accuracy desired may require effectively "equalizing" the magnitude of the deviations in the overall stress sensitivity at the desired operating temperature extremes. This could be accomplished by making the gaps between curve 111 and line 112 in FIG. 3 at opposite temperature extremes substantially equal to one another. The circuit of FIG. 1, where resistor RX shown in dashed lines take on a nonzero resistance value, provides the capability of adjusting rather precisely the temperature compensation of the stress sensor bridge system sensitivity insofar as equalizing the deviation in stress sensitivity at a pair of selected opposite temperature extremes from the sensitivity occurring at temperature T0 extrapolated to these extremes.

In FIG. 1, the excitation voltage for the stress sensor bridge circuit is supplied by constant polarity voltage source 10 in series with resistor RX. Resistor RX is fabricated in a manner similar to resistor R0 so as to be substantially insensitive to temperature as compared with resistors R1 and R2 or the piezoresistive resistors in the bridge circuit, to be substantially isolated from stress, and to be capable of adjustment.

The excitation voltage for the stress sensor bridge is voltage VX which is applied between the two points where the series resistor pair RA and RB, in FIG. 1, are interconnected with the series resistor pair RC and RD. As will be shown, proper adjustment of the resistance value of RX will equalize the magnitude of the stress sensor bridge system sensitivity deviations from the extrapolated sensitivity at T0 at selected system temperature extremes above and below the normal ambient temperature T0.

The operation of the circuit of FIG. 1 with resistor RX having a nonzero resistance value will now be described. Assuming some arbitrary resistance value of RX, and further assuming the stress sensor bridge is balanced at temperature T0 (no stress signal present), VB will be equal to VA, and, from equation (1), V2 will also be equal to V1. If RX is allowed to increase in resistance value at temperature T0, the voltage VX will begin to decrease causing the voltage VB and VA to also decrease. However, the difference VB−VA will remain the same because of the balanced bridge condition at temperature T0. From operational amplifier circuit analysis, a decrease in VA and VB will cause the voltages V2 and V1 to also decrease because VA and VB are applied to the non-inverting inputs of amplifiers A1 and A2; however, with VB−VA remaining the same, equation (1) indicates that voltage V2−V1 will also remain the same. Thus, no change in bridge output voltage VB−VA or first stage amplifier output voltage V2−V1 occurs as a result of increasing the resistance of RX when the bridge is balanced at temperature T0. The same is true if RX is decreased in resistance value at temperature T0 when the bridge is balanced. However, as will be seen, the stress sensitivity of the bridge is affected by changing the value of RX when the bridge is unbalanced.

Consider the operation of the circuit of FIG. 1 in the situation when RX has some nominal resistance value, and the system temperature is changed from T0 to a temperature less than T0. A decrease in temperature results in a proportionate decrease in each piezoresistive stress sensor resistance value because of the positive TCR thereof as set out above. This results in a greater voltage drop across RX at the lower temperature than previously existed at temperature T0, and a corresponding reduction in voltage VX because of voltage divider action across source 10, this being true because RX has a very low TCR compared to that of the stress sensor due to its construction as set out above. The decrease in VX at temperatures below T0 reduces the sensitivity of the sensor bridge system output voltage VB−VA for a change in applied stress since the bridge system output voltage sensitivity to stress is proportional to the applied bridge system voltage, VX. The greater the resistance value of RX, the smaller the value of VX, and so the greater the reduction in the sensitivity of the bridge system.

In the situation where the system temperature is changed from T0 to a temperature greater than T0, the piezoresistive stress sensor resistance value proportionately increases. This results in a lesser voltage across RX at the higher temperature than previously existed at temperature T0, and a corresponding increase in voltage VX. The increase in VX, the applied bridge system voltage, at temperatures above T0, increases the sensitivity of the sensor bridge system output signal voltage for a change in applied stress.

Thus, the value of resistance RX directly affects the effective sensor bridge system stress sensitivity, that is, the bridge output voltage signal sensitivity to a change in applied stress. As a result of the presence of resistance RX, the bridge output voltage signal sensitivity, VB−VA, decreases with increasing value of resistance RX at temperature T0. For a constant value of resistance RX, the bridge output voltage signal sensitivity will increase with increasing temperature, and will decrease with decreasing temperature. Referring to FIG. 3, an increase in value of resistance RX will modify the bridge system stress sensitivity such that the effective stress sensitivity thereof shown by curve 111, in FIG. 3, will rotate counterclockwise with increasing values of RX. A proper combination of the value of the amplification resistors R1 and R2 and the value of resistance RX will equalize the magnitudes of the stress sensitivity deviations at system operating temperature extremes above and below the normal ambient operating temperature T0.

Consider the situation where RX is of zero value, and the bridge system stress sensitivity temperature coefficient is compensated by amplifier system resistors R1 and R2 such that the bridge system stress sensitivity temperature coefficient is nearly compensated at temperatures above T0 and undercompensated at temperatures below T0. This is the resultant situation if bridge system sensitivity to stress is much greater at temperatures lower than T0 as compared with the sensitivity to stress at temperatures above T0. Further, the stress sensitivity temperature compensation provided by resistors R1 and R2 was just enough at temperatures above T0, but not enough compensation at temperatures below T0. In these circumstances, the value of resistance RX can be increased to both reduce the sensitivity of the bridge system at temperatures below T0 and increase the sensitivity of the bridge system at temperatures above T0 to more nearly equalize the deviation in the stress sensitivity to an applied stress occurring at the temperature extremes from the sensitivity occurring at T0.

In some circumstances, it may be desirable to have resistance RX to be at some initial value, and provide the amplifier system resistors R1 and R2 with a TCR such that the bridge system stress sensitivity temperature coefficient is overcompensated at temperatures above T0 and nearly compensated at temperatures below T0. In these circumstances, the value of resistance RX can be decreased to both increase the sensitivity of the bridge at temperatures below T0 and decrease the sensitivity at temperatures above T0 to more equalize the deviation in the stress sensitivity to applied stress occurring at the temperature extremes from the sensitivity occurring at T0.

Both the circuit arrangement shown in FIG. 1 with RX zero and with RX not being zero will be required in practice to have a specified output voltage versus applied stress characteristic, i.e. overall system stress sensitivity. Of course, any change in resistance value of RX for adjusting the stress sensor bridge system sensitivity at the temperature limits in the circuit of FIG. 1 will cause a subsequent change in the transducer system output voltage signal sensitivity to an applied stress at temperature T0, i.e. overall system stress sensitivity. However, as described by equation (5), a proper corresponding adjustment of the value of resistor R0 can adjust the amplifier system gain to provide the required specified output voltage versus stress characteristic. A proper combination of values for resistor RX and for temperature sensitive resistors R1 and R2 can provide the desired temperature compensation of the stress sensor bridge circuit stress sensitivity temperature characteristic S(T) resulting in appropriate temperature compensation in the stress transducer circuit to provide the desired overall system stress sensitivity Of particular note is the independence of resistors R0, R1, R2, and RX. Adjustment of R0 affects the gain of the first amplification stage without affecting the bridge system and without substantially affecting the temperature compensating effects of resistors R1 and R2, i.e. G(T)/G(T0) remains essentially unaffected by changes in R0. Adjustment of resistor RX only affects the system bridge sensitivity and the temperature characteristic therewith. Selection of resistor values for R1 and R2 affects the static gain of the first amplification stage, but more importantly, the selection of TCR of resistors R1 and R2 only affects the temperature compensation of the bridge system without affecting the static gain. Thus, once selection of resistors R1 and R2, and the TCR thereof, have been made, resistors R0 and RX may be independently adjusted based on empirical data or computer controlled techniques. In practice of the invention, it is convenient to keep R1 equal in size to R2. The values of R0 and RX may be empirically determined or may be selected based on statistical averages, and then adjusted in a manner appropriate to the structure chosen therefor as already indicated.

As described earlier, with reference to FIG. 2, another behavioral facet of the piezoresistive sensor bridge configuration, beyond having a temperature sensitive output sensitivity S(T) is a shift in the output voltage signal expression VB−VA as a function of temperature at a constant applied stress, most clearly seen at zero applied stress. The specific shift characteristic shown in FIG. 2 is a negative change in the output voltage signal expression VB−VA for an increase in temperature at a constant applied stress. Herein, the term "null voltage" is used to mean the value of the stress sensor bridge system output voltage signal expression VB−VA if the transducer system is at an arbitrary temperature T0 with zero stress applied to the diaphragm. Of course, a stress of a value other than zero, that is of some other arbitrary value in the operational stress range of the transducer system, could also be used to define a null voltage. Herein, the term "null shift" is used to mean the change in output voltage as measured from the "null voltage" at zero applied stress due to a change in temperature from the selected reference temperature T0. A means for compensating the null shift is shown in FIG. 5 and described below.

Shown in FIG. 5 is essentially the transducing system circuit of FIG. 1 drawn in a somewhat different form and with the addition of further temperature compensation circuitry to compensate temperature induced "null shift" in the stress sensor bridge system output voltage signal. The circuit components of FIG. 5 which perform the functions of, and are located similarly to, corresponding components in FIG. 1 have the same designation symbols in FIG. 5 as the corresponding components do in FIG. 1. Additionally, included in FIG. 5 is a null shift compensation network which includes a first circuit arrangement adjusting operating of the first amplification stage which, as earlier, includes operational amplifiers A1 and A2, and a second circuit arrangement adjusting operation of system output amplification stage 20 which is shown in FIG. 5 to include an operational amplifier, A3, this second circuit arrangement being responsive to the output of the first amplification stage. These first and second circuit arrangements cooperate with each other to provide temperature compensation of temperature induced null shifts exhibited in the stress sensor bridge system of FIG. 1.

The first circuit arrangement associated with the first amplification stage, includes resistors R3, R4, R5, R6, and R7, resistor R5 being capable of adjusted in resistance value. Resistors R3, R4, R5, R6, and R7 are substantially insensitive to stress by fabricating them in the same manner already described above with reference to resistors 105 and 106 of FIG. 4 in arranging these resistors in and one, or possibly just on, the stress transducer silicon diaphragm-constraint structure chip for the circuit of FIG. 5. Resistors R4, R6, and R7 are constructed to have a substantially lower TCR than that of resistor R3 by, for example, controlling the dopant concentration thereof, or by fabricating these resistors by use of low TCR thin film methods such as chrome-silicon resistors. Adjustable resistor R5 is intended to also have a low TCR relative to that of R3 and may be fabricated in a manner similar to that indicated above for resistor R0. R3 is intended to be a temperature sensitive resistor and is constructed in a manner similar to that indicated above for resistors R1 and R2.

Resistor R5 has a terminating region connected to the common interconnection point of temperature sensitive resistor R3 and resistor R4. The terminating region of resistor R3 not connected to resistors R5 and R4 connected to the common interconnection point of resistors RX and voltage source 10. RX is, of course, optional depending on the desire to affect S(T) at the temperature extremes in use as indicated above, and could be substituted for by a short circuit connection. The terminating region of resistor R4 not connected to resistors R3 and R5 is connected to the circuit zero reference voltage, i.e. ground. The terminating region of resistor R5 not connected to resistors R3 and R4 is electrically connected to the common interconnection point of resistors R6 and R7. The terminating region R7 not connected to resistors R6 and R5 is connected to the common interconnection point of resistors R0 and R1 and to the inverting input of amplifier A1. The terminating region of resistor R6 not connected to R5 and R7 is connected to the common interconnection point of resistors R0 and R2 and to the inverting input of amplifier A2.

The voltages presented at the inverting inputs of amplifier A1 and A2 are designated V5 and V6, respectively. Resistors R3 and R4 form a voltage division network across voltage source 10, source 10 providing a voltage V0, and the R3-R4 divider provides a bias voltage to the inverting inputs of amplifiers A1 and A2 having a value depending on both the resistance value of adjustable resistor R5 and the resistance value of temperature dependent resistor R3 (as well as the R4 value, of course). As will be later described, the purpose of this first circuit arrangement is to cause the output voltage expression V2+V1 of the first amplification stage to be temperature sensitive, the temperature sensitivity thereof primarily dependent upon temperature sensitive resistor R3, but with the differential output voltage of the first amplification stage and with the bridge system output voltage sensitivity to stress being independent of temperature sensitive resistor R3.

Output amplification stage 20, as shown in FIG. 5, includes amplifier A3 which is similar or identical in nature to amplifiers A1 and A2 as indicated above, and a pair of associated closed loop gain setting resistors, R9 and R10. Resistor R9 has one terminating region thereof connected to the inverting input of amplifier A3 and the other terminating region thereof connected to the interconnection of resistor R1 and the output of amplifier A1. Resistor R10 is connected between the output of amplifier A3 and the inverting input thereof.

Also shown in FIG. 5 is the second circuit arrangement which is essentially a means for setting the transducer system "null voltage" at the output of amplification stage 20. The null setting means includes resistors R8, R11, R12, R13, and R14 and which may be considered to be part of an output transformation stage for converting the first stage output differential signal to a single voltage signal with respect to a reference signal, here again ground.

Resistors R8, R9, R10, R11, R12, and R13 are intended to be substantially insensitive to stress, and may be fabricated in a manner similar to that indicated above for resistors 105 and 106 of FIG. 4 in arranging these resistors in and on, or possibly just on, the stress transducer silicon diaphragm-constraint structure chip for the circuit of FIG. 5. Resistor R14 may be fabricated in the manner indicated above for resistor R0 so as to be capable of adjustment and to also be insensitive to temperature and stress.

As shown in FIG. 5, resistor R8 has one terminating region thereof connected to the common interconnection point of resistor R13 and the non-inverting input of amplifier A3, and the other terminating region thereof connected to the common interconnection point of resistor R2, resistor R12, and the output of amplifier A2. Also shown, one terminating region of each of resistors R11, R12, R13, and R14 is connected to a common interconnection point. The remaining terminating region of resistor R11 is connected to the common interconnection point of resistors R1 and R9 and the output of amplifier A1. The remaining terminating region of resistor R12 is connected to the common interconnection point of resistors R2 and R8 and the output of amplifier A2. The remaining terminating region of resistor R13 is connected to the common interconnection point of resistor R8 and the non-inverting input of amplifier A3. The remaining terminating region of adjustable resistor R14 is connected to ground.

The voltages present at the output of amplifiers A1 and A2 from the circuit of FIG. 5 are hereafter designated V1' and V2', respectively. The null setting input voltage for amplifier A3 is presented at the common interconnection point of resistors R11, R12, R13, and R14, and is designated as voltage V7. From ordinary circuit analysis, the null setting voltage V7 may be mathematically expressed as shown in equation (6).

$$V7 = R14 \times \frac{\frac{V2'}{RY} + \frac{V1'}{R11}}{1 + \frac{R14}{R11} + \frac{R14}{RY}} \tag{6}$$

$$\text{where } RY = \frac{R8 + R13}{1 + \frac{R8}{R12} + \frac{R13}{R12}}$$

If the resistance value of RY is essentially made equal to resistance R11, equation (6) can be simplified as shown by equation (7).

$$V7 = (V2' + V1') \times \frac{1}{2 + \frac{R11}{R14}} \triangleq (V2' + V1') \times K1 \tag{7}$$

As indicated by equation (7), the null setting input voltage V7 is directly proportional to the sum of voltages V2' and V1'. Further, the null setting voltage V7 may be adjusted by controlling the value of resistance R14. As also indicated by equation (7), increasing the resistance value of resistor R14 causes the voltage V7 to increase, being limited in maximum value to one-half the sum of the voltages V2' and V1'.

The output voltage of the amplifier system output amplification stage 20, designated by the voltage V3' in the circuit diagram of FIG. 5, may be mathematically expressed as shown in equation (8a) below. Assuming that the ratio of resistances of resistors R10/R9 is substantially equal to the ratio of resistances of resistors R13/R8, a ratio to be designated K2 (for unity gain, K2=1), equation (8a) can be simplified to that shown in equation (8b):

$$V3' = \left( \frac{V7}{1 + \frac{R13}{R8}} + \frac{V2'}{1 + \frac{R8}{R13}} \right) \left(1 + \frac{R10}{R9}\right) - V1' \times \frac{R10}{R9} \tag{8a}$$

$$V3' = V7 + (V2' - V1') \times (K2) \tag{8b}$$

Of course, the term V2'−V1' represents an amplified version of the bridge system output voltage signal expression VB−VA as it occurs at the output of the first amplification stage.

Substituting equation (7) into equation (8b) as shown in equation (9), the output voltage V3' is equal to the null setting voltage V7, which is related to the sum of V2' and V1' by equation (7), and the bridge circuit output signal voltage expression VB−VA represented by the difference of V2' and V1':

$$V3' = (V2' + V1') \times K1 + (V2' - V1') \times K2 \tag{9}$$

As will be now shown, the resistance values of resistor R5 and temperature sensitive resistor R3 affect the value of V2'+V1', but without affecting the value of V2'−V1' or the bridge circuit output voltage sensitivity to stress. This allows the output voltage V3' to be temperature compensated for a thermally induced null shift in the sensor bridge without affecting the transducer system sensitivity stress applied to the chip diaphragm.

The circuit parameters of the first amplification stage including the first circuit means of FIG. 5 are arranged to have substantially the following relationships between resistors R1, R2, R6, and R7:

$$\frac{R1}{R7} = \frac{R2}{R6} \text{ and } R1 = R2 \tag{10}$$

With the conditions of equations (10) met, equations for the output voltage expressions involving V1' and V2' of the amplifier system first stage, including the additional first circuit arrangement can be written as follows from ordinary operational amplifier analysis:

$$(V2'-V1') = G'(VB-VA) \tag{11a}$$

$$\text{where } G' = 1 + \frac{R1+R2}{R0} + \frac{R1+R2}{R6+R7} \tag{11b}$$

$$(V2'+V1') = (VB+VA)\left(1 + \frac{R1}{R6}\right) - \tag{12a}$$

$$\frac{V0}{R3(R5+R')} \left( \frac{R'}{1/R3+1/R4+1/(R5+R')} \right) \left(2 \times \frac{R1}{R7}\right) +$$

$$\frac{V'}{(R5+R')} \left[ R5 + \frac{R'/(R5+R')}{1/R3+1/R4+1/(R5+R')} \right] \left[ 2 \times \frac{R1}{R7} \right]$$

$$\text{where } V' \triangleq \frac{(V5 \times R6)+(V6 \times R7)}{R6+R7} \text{ and } R' \triangleq \frac{R6 \times R7}{R6+R7} \tag{12b}$$

The first amplification stage output voltage signal expression V2'−V1', as expressed by equation (11a), represents the voltage signal provided to the input of output amplification stage 20. As shown in equation (11a) and in equation (11b), the sensor bridge circuit output voltage signal VB−VA is amplified by gain G' of the first amplification stage. Gain G' as shown by equation (11b) is a function of temperature sensitive resistors R1 and R2, and the substantially less temperature sensitive resistors R0, R6, and R7. The temperature sensitive gain G' compensates the sensor bridge circuit stress sensitivity temperature coefficient in essentially just the manner that has already been described with reference to the circuit of FIG. 1. (Note that equation 11b is identical to equation (6) in form if R0 in equation (6) is replaced by the effective parallel resistance of resistor R0 in parallel with the series combination of resistors R6 and R7.)

The effective temperature coefficient K' of the gain, G', is mathematically shown in equation (13) as it results from using a first order Taylor expansion about T0 as before, see equation (5). The temperature coefficient K' is directly related to the TCR, Q, of temperature sensitive resistors R1 and R2 in the same general manner as in equation (5). In equation (13), resistors R0, R6, and R7 are all taken to be substantially independent of temperature in comparison to R1 and R2.

$$K' = Q \times \cfrac{1}{\cfrac{(R0)\,(R6 + R7)}{(R1 + R2) + (R0 + R6 + R7)}} \quad (13)$$

An analysis quite like that in the discussion of FIG. 1 again shows that if G(T) is inversely proportional to the stress sensor bridge system sensitivity S(T), the output stress sensitivity of the amplifier system first stage will be substantially independent of temperature in the manner already described.

The output voltage expression V2+V1 of the first amplification stage is also an input to the output amplification stage 20 and related to determining the null set of that output amplification stage. As described by equation (12a), the output expression V2'+V1' of the first amplification stage depends on the first term of equation (12a) which includes as a factor the output expression VB+VA of the sensor bridge circuit; on the second term of equation (12a) which includes as a factor the value V0 of supply voltage 10, the value of the second term depending on the resistance value of temperature sensitive resistor R3 and on the resistance value of adjustable resistor R5; and on the third term of equation (12a) which includes as a factor the value of a reference voltage, V', (defined in equation 12b) and on the resistance value of adjustable resistor R5.

Note that reference voltage V' is dependent upon the voltages V5 and V6. From ordinary operational amplifier analysis, voltage V5 is essentially equal to voltage VA, and voltage V6 is essentially equal to voltage VB. Further, for a balanced bridge, the sum of voltages VA and VB are substantially constant, since as indicated above they vary oppositely in magnitude in response to stress applied to the chip diaphragm, and the sum of voltages V5 and V6 is therefore also substantially constant. Thus, the first term of equation (12a) is essentially constant. The last term of equation (12a) is also essentially constant, at least after resistor R5 is adjusted and then left fixed, since the varying resistance value of resistor R3 in response to changing temperature has a relatively small influence in this third term. This is true because, as can be seen in FIG. 5, VA and VB do not depend on the voltage V0 of source 10 through resistor R3; hence, since voltages V5 and V6 are essentially equal to voltages VA and VB, voltages V5 and V6 cannot depend to any substantial extent on source 10 and resistor R3 either.

The second term in equation (12a), in which the value V0 of source 10 appears along with the resistance values of resistors R3 and R5, is primarily inversely dependent upon the temperature sensitive resistor R3 and adjustable resistor R5. Resistor R3, which is fabricated in the manner of resistors R1 and R2 as indicated above and usually concurrently therewith, will also have approximately the positive temperature coefficient of resistors R1 and R2.

If the temperature rises, R3 will increase in resistance value causing the voltage expression V2'+V1' to increase since the negative second term of equation (12a) will be decreasing. As will be shown, this change in voltage V2'+V1' provides the desired null shift temperature compensation.

The operation of the circuit arrangement shown in FIG. 5 will now be described. Applying a constant stress to the chip diaphragm, assume as the temperature decreases that the piezoresistive bridge exhibits a positive shift in the bridge circuit output voltage signal expression VB−VA. That is, VB−VA increases for a decrease in temperature at a constant applied stress, as illustrated in FIG. 2, causing the output V2'−V1' of the first amplification stage to proportionately increase. (The shift could just as well be negative for another sensor bridge as indicated in the text above associated with FIG. 2.) As a result of this positive shift in the bridge circuit output voltage signal expression VB−VA, the output voltage V3' tends to increase as indicated by the second term in equation (9) and equation (11a). At the same time, temperature sensitive resistor R3 decreases with decreasing temperature because of the positive temperature coefficient associated therewith. Thus, the voltage V2'+V1' decreases as indicated by equation (12a) because that equation shows the second term thereof to be primarily inversely dependent on resistor R3. This, in effect, causes the voltage V3' to tend to decrease as indicated in the first term in equation (9). Thus, the tendency of the transducing system output voltage V3' to increase due to the increase in output voltage signal expression VB−VA, caused by the positive null shift with a decrease in temperature, is offset by the tendency of V3' to decrease because of the response of temperature sensitive resistor R3 to the same temperature decrease. The amount of compensation provided by the effect of temperature sensitive resistance R3 is determined by adjustable resistor R5. As seen by equation (12a), if R5 increases to infinity, the latter two terms of equation (12a) are reduced to zero so the resistance value of resistor R5 can significantly control these terms. (Note that the resistance value of R5 going to infinity is equivalent to converting the circuit of FIG. 5 to essentially the circuit of FIG. 1.) By proper value selection of adjustable resistor R5 and temperature sensitive resistor R3, null shift temperature compensation of the piezoresistive bridge can be provided.

In a practical circuit implementation, the amount of null shift temperature compensation to be provided by the temperature sensitive resistor R3 through the adjustment of resistor R5 can be determined by empirical data. Good results have been obtained by first providing the resistance value of resistor R5 with a very large value to effectively provide negligible null shift temperature compensation. Then, the empirical temperature characteristic data of the transducer can be obtained. Once the data has been obtained, resistance R5 can be decreased in value to provide the desired amount of null shift temperature compensation.

After the appropriate null shift compensation has been provided by the adjustment of R5, the transducing system output voltage (the null voltage) for a chosen applied stress may be set as desired at some temperature. This is accomplished, as indicated below equation (7) above, by adjustment of resistance R14.

As previously indicated, temperature sensitive resistors R1, R2, and R3 can be fabricated in the silicon diaphragm-constraint structure chip that piezoresistive sensors RA, RB, RC, and RD are fabricated, and they also will typically be fabricated using common ion implantation process steps. These resistors will have values typically in the order of 5 to 10 K ohms. The constant terms K1 and K2 of equations (7) and (8) are dependent upon ratios of the resistance values of resistors R8, R9, R10, R11, R12, and R13 rather than upon absolute resistance values of any of these resistors. Therefore, if these resistors each has a TCR matched to that of every other one, the value of the TCR is relatively unimportant. As a result, resistors R8, R9, R10, R11, R12, and R13 may also be ion implanted resistors in the chip fabricated during the same process steps, and having the same dopant distribution, as are sensor piezoresistors RA, RB, RC, and RD, and gain resistors R1 and R2. Typically, resistors R9 and R10 will have equal resistance values, approximately 10 K ohms, resulting in output amplification stage 20 having unity gain. Further, the value of resistor R11 being approximately equal to resistor R9, and values of resistors R8, R11, R12, and R13 are such that the value of the effective resistance value of resistors R8 and R13 in parallel with R12 (R12 being about 20 K) is approximately equal to the value of R11. Adjustable resistor R14 will be on the order of 1 to 10 K ohms. Resistors R3, R4, R6, and R7 will typically have equal values on the order 5 to 10 K ohms although the value of R3 is, of course, intended to change with temperature while the others are not. Adjustable resistor R5 will be on the order of 1 to 40 K ohms.

The structure of each piezoresistive sensor of the bridge circuit arrangement as provided in the diaphragm portion of the silicon diaphragm-constraint structure chip, and the structure of this chip and mount, primarily determine the actual bridge circuit null shift with temperature. The bridge circuit characteristic shown in FIG. 2 shows a positive shift in the bridge circuit output voltage signal expression VB−VA with a decrease in temperature at a constant applied stress. As previously indicated, another structure in another chip may lead to the bridge circuit having a negative shift in VB−VA for a decrease in temperature at a constant applied stress.

The choice of R3 as the temperature sensitive resistor in the R3-R4 voltage divider network across source 10, as shown in FIG. 5, provides null shift temperature compensation for a sensor bridge system exhibiting the null shift characteristic described in FIG. 2, i.e. a positive shift in bridge system output voltage signal expression VB−VA for a decrease in temperature. However, making resistor R4 the temperature sensitive resistor in this R3-R4 divider network will provide the necessary null shift temperature compensation for a sensor bridge system exhibiting a negative shift in voltage for a decrease in temperature. The selection of which of resistors R3 and R4 is to be made temperature sensitive depends upon the particular null shift characteristics of each piezoresistive sensor bridge circuit structure-chip structure arrangement.

The resistor RX, used for equalizing the deviations in stress sensitivity at the temperature extremes about T0, may be alternatively added to the circuit of FIG. 5 in the same manner as shown with reference to FIG. 1 with similar results.

The schematic circuit diagram shown in FIG. 6 provides a different circuit arrangement alternate to that shown in FIG. 5 for compensating either positive or negative sensor bridge system null shifts. The circuit diagram shown in FIG. 6 includes a piezoresistive sensor bridge circuit, first amplification stage, and stress sensitivity temperature compensation means similar to that shown in FIG. 1. Also shown in FIG. 6 are a bidirectional null shift temperature compensation circuit arrangement and an output amplification stage null setting arrangement.

The circuit components in FIG. 6 which perform the functions of, and are located similarly to, corresponding components in FIG. 1 have the same designation symbols in FIG. 6 as the corresponding components do in FIG. 1. Shown in FIG. 6 is the piezoresistive sensor bridge circuit including the sensors RA, RB, RC, and RD. The bridge at the common interconnection point of sensors RA and RC is connected to resistor RX which is in series with constant polarity voltage source 10, this series circuit branch being connected between the bridge circuit and the circuit zero voltage reference, i.e. ground. The common interconnection point of resistors RA and RB, and the common interconnection point of resistors RC and RD of the sensor bridge are again connected to the non-inverting inputs of amplifiers A1 and A2, respectively, just as in FIG. 1. Amplifiers A1 and A2 are of the same nature as similarly designated amplifiers in FIG. 1, but here provide output signal voltages designated V1″ and V2″, respectively.

Further included in the circuit of FIG. 6 are two resistors R25 and R26, which provide input impedance matching at the inputs of each of amplifiers A1 and A2 to minimize the effects of changing input offset currents in each amplifier due to temperature changes. Resistor R25 is connected between the inverting input of amplifier A1 and the common interconnection point of resistors R0 and R1. Resistor R26 is connected between the inverting input of amplifier A2 and the common interconnection point of resistors R0 and R2. Resistor R25 is chosen in resistance value such that the current flowing in the inverting input of amplifier A1 is substantially equal to the current flowing in the non-inverting input thereof. Resistor R26 is chosen in resistance value so that a similar matched current condition occurs in the two inputs of amplifier A2. Using resistor R25 and R26, the temperature effects of the input offset currents of the amplifiers A1 and A2 are minimized. Resistors R25 and R26, being in series with the usually large input impedances of amplifiers A1 and A2, respectively, have negligible other effects on the operation of the circuit of FIG. 6. Therefore, no further mention of these resistors will be made in describing the operation of the circuit of FIG. 6 below. Resistors R25 and R26 are intended to be formed in the same silicon diaphragm-constraint chip. The TCR of these resistors is not critical so that they are formed using any of the fabrication processes already discussed, or other well known processes.

The terminating region of resistor R1 not connected to resistor R0 again is connected to the output of amplifier A1. Similarly, the terminating region of resistor R2 not connected to resistor R0 is connected to the output of amplifier A2. Resistors R0, R1, and R2 perform the same functions and are constructed in the same manner set out in connection with FIG. 1.

The sensor bridge circuit as shown in FIG. 6 has additional circuit components included therein beyond the components included in the bridge circuit shown in FIG. 1. These include a parallel combination of resistors, R27 and R28, connected between piezoresistive sensor element RD and ground. The bridge circuit further includes a parallel combination of resistors, R29 and R30, connected between piezoresistive sensor element RB and ground. Resistors R27 and R29 are intended to be temperature sensitive resistors formed in the same silicon diaphragm-constraint chip as are the piezoresistors RA, RB, RC, and RD. Resistors R28 and R30 are also to be formed in the same chip and are intended to be resistors subject to being adjusted in resistance value and to be substantially insensitive to temperature relative to resistors R27 or R29, i.e. having a much smaller TCR than do resistors R27 and R29. Further, resistors R27, R28, R29, and R30 are all intended to be substantially insensitive to stress by arranging them in the silicon diaphragm-constraint structure as part of the monolithic integrated circuit corresponding to the FIG. 6 diagram being formed in this chip, in a manner similar to resistors 105 and 106 of FIG. 4.

Resistors R27 and R29 may be fabricated in a manner similar to that of resistors R1 and R2, as indicated in connection with FIG. 1, such that they may be formed in the same process step that sensor piezoresistors RA, RB, RC, and RD are formed, i.e. all formed in common ion-implantation steps with each having substantially the same dopant distribution. As a result, resistors R27 and R29 will also have positive temperature coefficients (TCR's) such as are indicated above for each of resistors R1 and R2. As will be described below, the temperature sensitivity of resistors R27 and R29 provide temperature compensation for null shift, i.e. the shift with temperature of the bridge circuit output voltage signal expression VB−VA.

As indicated earlier, resistors R28 and R30 are intended to be resistor arrangements subject to being adjusted in resistance value. Resistors R28 and R30 may be fabricated in a manner similar to resistor R0 as set out in connection with describing the circuit of FIG. 1. As will be described below, the preferable initial values of resistances R28 and R30 in the circuit arrangement of FIG. 6 are conveniently values which are less than, or substantially equal to the resistance values of resistors R27 and R29, respectively. Resistors R28 and R30 may be adjusted in resistance value in manners as already described for resistor R0. For example, resistors R28 and R30 may be chrome silicon thin film resistors fabricated on top of the silicon diaphragm-constraint, monolithic integrated circuit chip. Adjustment of these resistors may be accomplished by laser or abrasive trimming.

Resistor RX in series with voltage source 10 provides improved sensor circuit performance similar to that as described in connection with FIG. 1 by altering the stress sensitivity characteristic of the bridge at temperature extremes above and below T0. Resistor RX is, of course, optional as it was in FIG. 5, and is intended to be fabricated in and on, or possibly just on, the chip such as to be insensitive to stress, and is also intended to be a resistor having a much lower TCR than the stress sensors. RX may be, for example, constructed in a manner similar to R0 as set out in connection with describing the circuit of FIG. 1. Resistors R0, RX, R28, and R30 may all be constructed in the same manner so as to provide the capability of adjustment of the resistance value of each.

The outputs of amplifiers of A1 and A2 are each connected to one of the two inputs of an output amplification stage, 200, i.e. an output transformation stage. Output amplification stage 200 includes an amplifier, A4, similar or identical in nature to amplifiers A1 and A2, and arranged as a differential operational amplifier similar to the arrangement of amplifier A3 of FIG. 5. Output amplification stage 200 further includes a first null setting arrangement connected to the non-inverting input of amplifier A4, a second null setting arrangement connected to the inverting input of amplifier A4, a closed loop gain setting resistor, and an input arrangement for receiving the outputs of the first amplification stage.

The first null setting arrangement includes the network comprised of a constant polarity voltage source, 11, of the same nature as is source 10 and series pair of connected adjustable resistors, R31 and R32, plus a further resistor, R33. Source 11 has one terminal connected to ground, and the other connected to one of the terminating regions of resistor R31. The other terminating region of resistor R31 is connected to the common interconnection point of resistors R32 and R33. The terminating region of resistor R32 not connected to resistors R31 and R33 is connected to ground. Resistor R33 is connected between the common interconnection point of resistors R31 and R32, and the non-inverting input of amplifier A4.

The second null setting arrangement includes a constant polarity voltage source, 12, of the same nature as is source 10 having one terminal connected to ground. Also included is a resistor, 34, which has one terminating region connected to the other terminal of source 12, and has the other terminating region connected to the inverting input of amplifier A4.

The closed loop gain of amplifier A4 is substantially determined by resistor R35 which is connected between the output and the inverting input of amplifier A4. A first input to output amplification stage 200, taken from the output of amplifier A1 at which is present voltage V1", is provided by a terminating region of a resistor, R37, which is connected to the output of amplifier A1. The other terminating region of resistor R37 is connected to the inverting input of amplifier A4. A second input to output amplifier stage 200, taken from the output of amplifier A2 at which is present voltage V2", is provided by a terminating region of a resistor, R36, which is connected to the output of amplifier A2. The other terminating region of resistor R36 is connected to the non-inverting input of amplifier A4.

As is well known in the art of operational amplifiers, a positive voltage from the voltage divider across source 11 coupled by resistor R33, i.e. from the first null setting arrangement, to the non-inverting input of amplifier A4 will cause the output voltage of the amplifier A4, designated V3", to increase, assuming A4 is not in saturation. On the other hand, a positive voltage from source 12 coupled by resistor R34, i.e. from the second null setting arrangement, to the inverting input of amplifier A4 will cause the output voltage V3" to decrease, again assuming A4 is not in saturation. As was stated above, the null voltage of the transducer circuit is chosen for a specific temperature and applied stress condition (usually zero applied stress). Independent adjustment of resistor R34, or of resistors R31 and R32 together, or of all of these resistors will provide the desired null voltage setting capability for the transducing system through adjusting the output voltage of amplifier A4. Note that the second null setting arrangement is simply a Norton equivalent of the first null setting arrangement. Many possible arrangements for providing an adjustable voltage bias for use in such null setting are possible, and thus arrangements shown in FIG. 6 are only exemplary.

Consider now the mathematical expressions for the output voltage V3" of amplifier A4. The circuit of FIG. 6 is arranged to have the following conditions met for the resistance value of resistors R31, R32, R33, R34, R35, R36, and R37:

$$R36 + R33 \text{ is much greater than either } R31 \text{ or } R32 \quad (14)$$

-continued $$\frac{R36}{R33} = \frac{R37}{R35} \times \left(1 + \frac{R35}{R34}\right) \quad (15)$$

Assuming the relationships of equations (14) and (15), and that voltage sources 11 and 12 provide a voltage output equal to that of voltage source 10 by all having an output voltage value equal to V0, the output voltage V3″ of the output amplification stage 200 can be expressed by equation (16) using ordinary operational amplifier analysis.

$$V3'' = (V2''-V1'')\frac{R35}{R37} + V0\left(\frac{1 + \frac{R35}{R34}}{1 + \frac{R31}{R32}} - \frac{R35}{R34}\right) \quad (16)$$

As seen by inspection of equation (16), the portion of the output voltage V3″ related to signals in the first amplification stage is equal to the closed loop gain of amplifier A4, as determined by the ratio of resistors R35/R37, multiplied by the differential voltage V2″−V1″. The output "null voltage" portion of V3″ is determined by resistance ratio R35/R34, by resistance ratio R31/R32, and by the common voltage value supplied by sources 10, 11, and 12, each having voltage value V0.

As indicated earlier, sensor bridge circuits can exhibit either a positive or negative null shift characteristic. That is, at a constant applied stress, the bridge circuit output voltage signal expression VB−VA may increase (positive null shift) or decrease (negative null shift) for an increase in system temperature. These potential null shifts, when measured at the output of amplifier A4, include all possible temperature induced shifts in the system. They include, for example, both thermally induced stress SHIFT, amplifier input offset voltage and current shifts, and shifts caused by unmatched TCR's in some of the resistor networks. The inclusion of the parallel combination of resistors R27 and R28 and the parallel combination of resistors R29 and R30 in the circuit of FIG. 6 provides the capability of positive and negative null shift temperature compensation as will be described below. Further, these parallel resistor combinations also provide a means for "balancing" the bridge circuit, i.e. setting VA equal to VB at temperature T0 with either zero, or some other value, of stress applied to the chip diaphragm. In practicing the invention, bridge balancing is not necessarily required.

The effective resistance value of parallel resistors R27 and R28 may be selected by an appropriate resistance value adjustment of relatively temperature insensitive resistor R28. Increasing the resistance value of R28 causes the voltage VA to increase because of effective voltage divider action of the parallel resistor combination of R27 and R28 in series with sensors RC and RD, and with resistor RX, all in series with source 10. Reducing the resistance value of R28 for the same reason reduces VA. Similarly, the effective resistance value of parallel resistors R29 and R30 may be selected by appropriate adjustment of the relatively temperature insensitive resistor R30. Increasing or decreasing R30 causes the voltage VB to correspondingly increase or decrease again because of effective voltage divider action of the parallel combination of resistors R29 and R30 in series with sensors RA and RB, and with RX, all in series with source 10. By selective adjustment of either resistors R28 or R30, sensor bridge circuit voltage VB can be made equal in value to circuit voltage VA to balance the sensor bridge circuit.

In addition to providing a means for balancing the sensor bridge system, the parallel resistor combinations R27-R28, and R29-R30, also provide a means for compensating for either positive or negative sensor bridge circuit null shift. Null shift compensation is provided by further adjusting either resistor R28 or R30 to alter the effective TCR of the parallel resistor combinations resulting in a change in the effective TCR of that branch of the sensor bridge circuit containing the parallel resistor combination in which an adjustment occurred to thereby compensate for null shift as will be described in the following.

Of course, subsequent adjustment of either of resistors R28 or R30 if done after the bridge has been previously balanced will unbalance the bridge. Balancing the bridge in the circuit arrangement of FIG. 6 essentially establishes substantially equal input, and so equal output, voltages for amplifiers A1 and A2. The change in resistance value of either resistor R28 or R30 in providing null shift compensation is intended to be small with respect to the actual values of the sensor resistances, and therefore subsequent adjustment thereof after bridge balancing will usually not substantially unbalance the bridge.

For exposition purposes, parallel resistor combination R27-R28 has an effective resistance designated RPD, and an effective TCR, designated $TCR_{RPD}$. Further, parallel resistor combination R29-R30 has an effective resistance RPB, and an effective TCR, designated $TCR_{RPB}$. In the discussion that follows, the piezoresistor sensors RA, RB, RC, and RD, and the temperature sensitive resistors R27 and R29 are assumed to have identical TCR's as will be substantially the situation since they are fabricated concurrently. Further, the TCR of adjustable resistors R28 and R30 is substantially lower than the TCR of temperature sensitive resistors R27 and R29, and therefore, adjustable resistors R28 and R30 are assumed, below, to have a zero temperature coefficient.

The effective TCR of the parallel resistor combinations R27-R28 and R29-R30 may be found by differentiating the effective value of the parallel resistance combinations with respect to temperature, and dividing by the effective resistance at temperature T0. An expression for the effective TCR of each of the parallel resistor combinations R27-R28 and R29-R30 are shown in equation (17a) and equation (17b), respectively:

$$TCR_{RPD} = \frac{\frac{dRPD}{dT}}{RPD(T0)} \triangleq \gamma 1 \times (TCR \text{ of } R27) \quad (17a)$$

$$\text{where } \gamma 1 \triangleq \frac{1}{1 + \frac{R27}{R28}} \text{ and } RPD \triangleq \frac{R27 \times R28}{R27 + R28}$$

$$TCR_{RPB} = \frac{\frac{dRPB}{dT}}{RBB(T0)} \triangleq \gamma 2 \times (TCR \text{ of } R29) \quad (17b)$$

$$\text{where } \gamma 2 \triangleq \frac{1}{1 + \frac{R29}{R30}} \text{ and } RPB \triangleq \frac{R29 \times R30}{R29 + R30}$$

As indicated by equation (17a), the effective TCR of the parallel resistor combination R27-R28 is, of course, dependent upon the TCR of resistor R27, and the ratio of the resistance values of resistors R27 and R28. As resistor R28 is adjusted in resistance value from zero to a value much greater than that of resistor R27, the effective TCR of the parallel resistance combination R27-R28 changes from zero to a value approximately equal to the TCR of resistor R27. As the resistance value of R30 is adjusted from zero to a value much greater than the value of resistance R29, the TCR of parallel resistor combination R29-R30 changes from zero to a value approximately equal to the TCR of resistor R29. Thus, the TCR of each of the parallel resistor combinations R27-R28 and R29-R30 may be chosen, within the range possible, by an appropriate choice of resistance values for R28 and R30, respectively.

Consider now the effective TCR of the circuit branch containing sensor RD and the parallel resistance combination R27-R28. Equation (18a) below gives an expression for the TCR of the circuit branch containing sensor RD where the parallel resistance combination R27-R28 has an effective resistance value RPD, as indicated above, and a TCR as set out in equation (17a). The effective TCR of the circuit branch containing sensor RB is given in equation (18b) below where the parallel resistor combination R29-R30 has an effective resistance value RPB, as indicated above, and a TCR as set out in equation (17b).

$$TCR_{(RD+RPD)} = \frac{RD \times (TCR \text{ of } RD) + RPD \times Y1 \times (TCR \text{ of } R27)}{RD + RPD} \quad (18a)$$

$$TCR_{(RB+RPB)} = \frac{RB \times (TCR \text{ of } RB) + RPB \times Y2 \times (TCR \text{ of } R29)}{RB + RPB} \quad (18b)$$

Equations (18a) and (18b) can be further simplified as shown in equations (19a) and (19b) for the situation where the TCR of sensors RB and RD are equal to the TCR of resistors R27 and R29 respectively.

$$TCR_{(RD+RPD)} = (TCR \text{ of } RD) \times \left( \frac{RD}{RD + RPD} + \frac{Y1 \times RPD}{RD + RPD} \right) \quad (19a)$$

$$TCR_{(RB+RPB)} = (TCR \text{ of } RB) \times \left( \frac{RB}{RB + RPB} + \frac{Y2 \times RPB}{RB + RPB} \right) \quad (19b)$$

Equations (19a) and (19b) are similar in nature and therefore only equation (19a) will be discussed. As indicated by equation (19a), the TCR of the circuit branch containing sensor RD is limited to a maximum TCR equal to the TCR of sensor RD. This is so because the factor in equation (19a) multiplying the TCR of sensor RD must always be less than or equal to one since Y1 can never be greater than 1. Note that if the resistance or resistor R28 is zero, the temperature coefficient of the parallel resistor combination R27-R28 is zero because Y1 is zero, and the effective resistance of this parallel combination is also zero. In this situation, equation (19a) shows the effective TCR of the circuit branch containing sensor RD is equal to the TCR of sensor RD. On the other hand, if adjustable resistor R28 is very large in resistance value in comparison to that of resistor R27, the effective TCR of the circuit branch containing sensor RD is also the TCR of sensor RD since Y1 is equal to one. For values of resistance for resistor R28 that are between zero and very large, there will be a value of resistance R28 which results in a minimum TCR of the bridge circuit branch containing sensor RD for a given choice of resistance values for sensor RD and temperature sensitive resistor R27. As can be seen from the foregoing, once resistance values have been selected for sensor RD and temperature sensitive resistor R27, equation (18a) describes a unique TCR versus resistor R28 resistance value characteristic for the circuit branch containing sensor RD. Similarly, equation (18b) describes a unique TCR versus resistor R30 resistance value characteristic for the circuit branch containing sensor RB.

The operative features of the null shift compensation provided by the parallel resistor combinations R27-R28 and R29-R30 will now be described. Assume that adjustable resistors R28 and R30 each are initially set at resistance values which cause the circuit branch containing sensor RD and the circuit branch containing sensor RB, respectively, to each have a minimum TCR. This assures that the branch of the bridge circuit containing sensor RD has an effective TCR less than that of sensor RD alone, and so less than that of the circuit branch containing sensor RC which has a TCR equal to that of RD alone as indicated above. Similarly, the branch of the bridge circuit containing sensor RB has an effective TCR less than the branch containing sensor RA.

Assume that the sensor bridge circuit output voltage signal expression VB−VA as well as the output voltage V3″ of the circuit of FIG. 6, in the above conditions, exhibit a positive null shift; that is, that VB−VA and V3″ each increase with an increase in temperature. This would be the situation where thermally induced stress unbalances the bridge circuit (RA, RB, RC, and RD) in the direction of an applied stress in the diaphragm portion of the chip resulting in a net increase in voltage value of VB−VA and V3″ with increasing temperature. (As indicated earlier, the net increase in V3″ can include other shifts such as input offset voltage.)

In the above situation, the TCR of the circuit branch containing sensor RD was previously at its minimum. An increase in the resistance value of adjustable resistor R28 will increase from the minimum the effective TCR of the bridge circuit branch containing sensor RD resulting in voltage VA increasing in resistance value more with temperature because of the increased temperature coefficient of the bridge circuit branch containing resistor RD, than if resistor R28 had not been increased. Thus, the magnitude of any increase in VB−VA with temperature due to the positive null shift characteristic of the bridge circuit without having changed the resistance value of R28 is reduced by VA increasing faster with temperature after changing the value of R28. In this manner, the positive null shift of the sensor shift system may be more or less compensated by appropriate selection of adjustable resistor R28. In like manner, the increase in resistance value of resistor R28 will compensate for a positive null shift in the transducer system output voltage V3″ for positive null shifts from any source in addition to the bridge circuit source.

Typically, the magnitude of the positive null shift is empirically determined at the operating temperature limits of the stress transducer chip. The resistance value of R28 is chosen to provide the best overall compensation at both high and low temperature limits noting that the null shift characteristic is not necessarily a linear function of temperature.

In the situation where a negative null shift is exhibited by the sensor bridge system, compensation may be provided by finding an appropriate resistance value for adjustable resistor R30. Assuming again that resistors R28 and R30 are chosen to provide minimum TCR's in their respective circuit branches, increasing R30 will cause the effective TCR of the branch of the bridge containing the sensor RB to increase. This results in a greater increase in voltage VB with increasing temperature than before R30 was increased in value. This causes the magnitude of the decrease in VB−VA with increasing temperature due to the negative null shift characteristic to be smaller than it otherwise would be without increasing the resistance value of R30. In this manner a negative null shift in VB−VA or V3" may be more or less compensated by appropriate selection of the resistance value of adjustable resistor R28.

Because of the nature of the voltage divider action on either side of the bridge, the combination of parallel resistors R27-R28 could be alternately in series with sensor RA, and the combination of parallel resistors R29-R30 could alternately be placed in series with sensor RC. Approximately the same null shift compensation could be achieved for the same changes in the values of resistance of resistors R28 and R30.

Note that adding a parallel resistor combination in series with the sensors reduces the effective sensitivity to stress of that branch in the bridge circuit. This is so because the fractional change in circuit branch resistance for a change in stress applied to the chip diaphragm decreases as the effective resistance of the parallel resistor combination, which is not affected by stress, increases. However, good results have been achieved by having the effective resistance of the parallel resistor combinations limited to being less than around 20% of the associated sensor nominal resistance value. Any change in the sensor bridge stress sensitivity can be adjusted by appropriate adjustment of the resistance value of resistor R0 in the first amplification system. Adjustment of R0 impacts only the gain of the first amplification stage as can be seen from equation (1) which is applicable here, and has no affect on either the stress sensitivity temperature compensation or the null shift compensation.

Note in the sensor bridge of FIG. 6 that any resistance value adjustment of adjustable resistors R28 and R30 affects not only null compensation but also the bridge balance at zero stress. Any change in bridge balance at zero stress affects the output voltage V3" for zero stress. The first and second null setting arrangements are provided for adjustment of V3" after values of R28 and R30 have been selected.

A practical method of calibrating the circuit of FIG. 6 may be accomplished by first balancing the sensor bridge by adjusting the resistance value of either resistor R28 or R30 to cause voltage VB to equal VA. Secondly, the voltages provided by one or both of the first and second null setting arrangements are adjusted by appropriate adjustment of the resistance value of resistors R31, or R32, or R34 to cause voltage V3" to be within the amplifier A4 linear range. In these circumstances, the transducer system silicon diaphragm-constraint structure chip, with an integrated circuit corresponding to the diaphragm at FIG. 6 formed in and on this chip, can be tested at operating temperature extremes to determine the actual null shift characteristic and stress sensitivity characteristic of this system so that null compensation may be provided by appropriate resistance value adjustments of either of resistors R28 or R30. RX may then be adjusted in resistance value to appropriately adjust the S(T) characteristic to equalize any deviations at the operating temperature extremes. After final adjustment of resistors R28 and R30, and of RX, the gain resistor R0 may be adjusted to provide the appropriate system sensitivity for the bridge circuit-first amplification stage combination. Lastly, the first and second null setting arrangements can then be appropriately adjusted again (adjusting the resistance values of R31, R32, or R34) to provide the desired null voltage of V3" at the output of amplifier A4 for a given stress applied to the chip diaphragm at temperature T0.

In monolithic integrated circuits, ratios of resistors may be easily controlled, particularly when fabricated by the ion-implantation method. The conditions shown in equations (15) and (16) may be easily achieved using this method. Thus, it is possible by proper circuit layout design of the integrated circuit to fabricate the stress sensors and most of the circuit resistors during one ion-implantation process step with all of these resistors having substantially the same resulting dopant distribution. Referring to FIG. 6, all resistors shown in FIG. 6, with the exception of the adjustable resistors R0, RX, R28, R30, R31, R32, and R34, may be resistors fabricated in common ion-implantation steps. R34 may be, for example, base diffused resistors or thin film chrome-silicon resistors which can be provided with very low TCRs.

Adjustable resistors R0, RX, R28, R30, R31, R32, and R34 may be provided in and on, or possibly just on, the stress transducer integrated circuit chip in a manner of fabrication similar to that earlier described for resistor R0, in connection with FIG. 1. Again, these adjustable resistors may be fabricated in and on, or just on, the integrated circuit chip in a manner to permit adjustment by either increasing or decreasing the resistance value thereof. The adjustable resistors might be thin or thick film resistors initially set to a value known to be lower than that ultimately desired, and then material in such a resistor may be trimmed away by the laser beam or sandblasting as appropriate until the correct resistance value is reached. These resistors may be fabricated on top of the diaphragm constraint monolithic integrated circuit, or off the chip on some other substrate. Thick film fabrication thereof may be done on some substrate other than the chip. Alternatively, the resistor-diode circuit arrangement as described with reference to resistor R0 might be used to arrive at their desired resistance values. It is important to note that according to equation (16), for the null voltage portion of V3" to be insensitive to temperature, the TCR's of R31 and R32, and the TCR's of R34 and R35 should be substantially equal. Since resistors R31 and R32 are of the same structure, the TCR's thereof will generally be equal. However, R35 from the above discussion is a non-adjustable ion-implant resistor whereas R34 is suggested to be adjustable and so possibly to have a different structure with a different TCR than R35. It is desirable that R34 should be of a selected value rather than being adjustable, and further, should be an ion-implant resistor like resistor R35 so as to have the same TCR. Null setting would then be confined to resistors R31 and R32.

The stress sensitivity characteristic shown in FIG. 2 for a typical sensor bridge system of the kind shown in FIGS. 1, 5, and 6 can be seen to exhibit a nonlinear stress sensitivity characteristic. This nonlinear phenomenon appears to be related to the specific structure design used for the sensors in the bridge system produced in the transducer diaphragm-constraint combination monolithic integrated circuit structure. In some circuit applications, the accuracy requirement will necessitate providing stress sensitivity linearity compensation.

Shown in FIG. 6 is a linearity stress sensitivity compensation network with the circuit components therein presented in dashed line form. The linearity compensation network shown in FIG. 6 includes an adjustable resistor, R39, and a pair of diodes, D1 and D2. The circuit further includes a pair of resistors, R37A and R37B, which are to be considered substitutes for resistor R37. A series combination is formed of resistor R39 and diodes D1 and D2 with the cathode of diode D1 connected to the anode of D2, the anode of D1 connected to a terminating region of R39, and the cathode of D2 connected to the common interconnection point of resistors R37A and R37B. The remaining terminating region of R39 is connected to the common interconnection point of the inverting input of amplifier A4 and the other terminating region of resistor R37B. Resistor R39 is chosen to have a greater resistance value that the value of resistance of resistor R37B.

The effect of the dashed line linearity compensation network is to increase the gain of the output amplification stage at higher stress conditions. As indicted by equation (16), the output voltage V3" is proportional to the difference in voltages V2" and V1", multiplied by the effective gain of the output amplification stage which is the resistance value ratio of resistors R35 and R37. However, in the present situation where R37 has been substituted for by the series combination of resistors R37A and R37B, the output amplification stage effective gain is the resistance ratio value of R35 to the sum of the resistance values, of resistors R37A and R37B. One means of modifying the gain at higher stress conditions is to cause the resistance value sum of resistors R37A and R37B to effectively decrease in the output stage gain ratio when differences in voltages V2" and V1" sufficiently increase as the result of sufficient stress being applied to the chip diaphragm. The linearity compensation network shown in FIG. 6 provides a circuit for such decreasing of the effective resistance value sum of resistors R37A and R37B.

The operation of the linearity compensation network in the circuit of FIG. 6 will now be described. Consider the situation when the output voltage of amplifiers A1 and A2 are positive and approximately equal to each other (approximately zero applied stress). In this situation, the output voltage V3" is essentially zero volts. In these circumstances, diodes D1 and D2 are effectively reversed biased, and the effective resistance between the output of amplifier A1 and the inverting input of amplifier A4 is the sum of the resistance values of resistors R37A and R37B. The effective resistance between the output of amplifier A1 and the inverting input of amplifier A4 will remain equal to the sum of the resistance values of resistors R37A and R37B as long as diodes D1 and D2 are reversed biased. As increasing stress is applied to the chip diaphragm, the stress sensor bridge circuit begins to respond to this increasing stress and the output voltage V2" will increase and the output voltage V1" will decrease, resulting in the output voltage V3" increasing in a manner described by equation (16). At some value of applied stress, the voltage across R37B will be substantially equal to the sum of the forward threshold voltage drops of diodes D1 and D2. Any further increase in stress, i.e. further decrease in V1" and increase in V2", will cause a current to flow through the series combination of resistor R39, and didodes D1 and D2. In effect, this latter action leads to a current path parallel to that through R37B, thus reducing the effective resistance of R37B and the effective resistance between the output of amplifier A1 and the inverting input of amplifier A4. This action results in increasing the gain of the output amplification stage R35/(R37A+R37B) because the effective resistance of the combination of resistor R37B in parallel with the series arrangement of diodes D1 and D2 with resistor R39 is decreasing.

The amount of stress sensitivity linearity compensation is determined by the resistance of resistor R39 and the forward threshold conduction characteristics of diodes D1 and D2. The forward threshold conduction characteristics of diodes D1 and D2 determine the voltage across R37B required before the effective resistance of R37B begins to decrease. The amount of linearity compensation, that is, how much the effective resistance of R37B decreases, is determined by the resistance value of resistor R39. There are, of course, many possibilities in the selection of resistors R37A, R37B, R39, and the diodes D1 and D2 for achieving linearity compensation, including the use of further diodes in the series string, or eliminating one of diodes D1 and D2. Further, additional resistor-diode networks could be added in parallel with R37B to provide varying amounts of linearity compensation in several different applied stress conditions. Other linearity compensation networks similar to the one shown in FIG. 6 varying the effective resistor ratio setting the gain of amplifier A4 can provide a change in gain of the output amplification stage as the applied stress to the sensor bridge varies.

In a practical circuit implementation, resistor R39 can be a series combination of a fixed resistor and an adjustable resistor. The fixed part of resistor R39, and resistors R37A and R37B also, can be fabricated using ion-implantation methods while the adjustable part of R39 can be a low TCR resistor fabricated in the manner described above for fabricating resistor R0. Furthermore, diodes D1 and D2 can be provided by pn junction diodes fabricated on the same chip along with all of the circuit components in the circuit arrangement shown in FIG. 6.

The embodiments of the invention in which an exclusive property or right is claimed are defined as follows:

1. A stress transducing system supported in and on a semiconductor material stress sensing structure having structural portions including substantially a diaphragm and a constraint for constraining said diaphragm at peripheral portions thereof, with said structure having a major surface bounding semiconductor material, said semiconductor material being of a first conductivity type except in selected locations thereof, said major surface being common to both said diaphragm and said constraint, said stress transducing system comprising:

a first semiconductor piezoresistive domain in said semiconductor material at a said selected location extending at least in part into said diaphragm, and with said domain being adjacent to said major surface, said first semiconductor piezoresistive domain having first and second terminating regions, said first semiconductor piezoresistive domain having therein a first distribution of dopant atoms with depth into said semiconductor material away from said major surface which leads to said first semiconductor piezoresistive domain being of a second conductivity type and having a temperature coefficient of resistance of a first magnitude which is effective in a first magnitude direction, said first semiconductor piezoresistive domain being a component part of a stress sensing circuit which is capable of providing a stress sensing circuit first output signal at a stress sensing circuit first output region of a magnitude varying in correspondence to changes in magnitude of stress applied to said diaphragm, said stress sensing circuit first output signal varying with such stress, as aforesaid, in a manner characteristic of said first semiconductor piezoresistive domain and remaining portions of said structure to thereby establish a stress sensing characteristic which characteristic also depends upon temperatures occurring in said structure;

a first semiconductor resistive domain in said semiconductor material at a said selected location and adjacent to said major surface, said first semiconductor resistive domain having first and second terminating regions, said first semiconductor resistive domain having substantially said first distribution of dopant atoms therein leading to said first semiconductor resistive domain being of said second conductivity type and having a temperature coefficient of resistance of substantially said first magnitude which is effective in said first magnitude direction, said first resistive domain being substantially free of effects in electrical behavior in response to stresses applied to said diaphragm, said first semiconductor resistive domain being a component part of a signal processing circuit having a signal processing circuit first input region which is electrically connected to said stress sensing circuit first output region and having a signal processing circuit output region, said signal processing circuit being capable of providing a stress transducer system output signal at said signal processing circuit output region which is a version of said stress sensing circuit first output signal but as compensated to be substantially free of effects of said temperature dependence in said stress sensing circuit characteristic; and a first primarily resistive domain adjacent to said major surface and supported by said structure, said first primarily resistive domain having first and second terminating regions, said first primarily resistive domain having a temperature coefficient of resistance of a magnitude substantially less than said first magnitude, said first primarily resistive domain being substantially free of effects in electrical behavior in response to stresses applied to said diaphragm and being a component part of said signal processing circuit.

2. The system of claim 1 wherein there is further provided a second semiconductor piezoresistive domain in said semiconductor material at a said selected location extending at least in part into said diaphragm, and provided adjacent to said major surface, said second semiconductor piezoresistive domain having first and second terminating regions, said second semiconductor piezoresistive domain having substantially said first distribution of dopant atoms therein leading to said second semiconductor piezoresistive domain being of said second conductivity type and having a temperature coefficient of resistance of substantially said first magnitude which is effective in said first magnitude direction, said second semiconductor piezoresistive domain being a component part of said stress sensing circuit with a selected one of said second semiconductor piezoresistive domain first and second terminating region being electrically connected to a selected one of said first semiconductor piezoresistive domain first and second terminating regions.

3. The system of claim 2 wherein there is further provided third and fourth semiconductor piezoresistive domains each in said semiconductor material at a said selected location extending at least in part into said diaphragm, and each provided adjacent to said major surface, said third semiconductor piezoresistive domain having first and second terminating regions and said fourth semiconductor piezoresistive domain having first and second terminating regions, said third and fouth semiconductor piezoresistive domains each having substantially said first distribution of dopant atoms therein leading to each of said third and fourth semiconductor piezoresistive domains being of said second conductivity type and each having a temperature coefficient of resistance of substantially said first magnitude which is effective in said first magnitude direction, said third and fourth semiconductor piezoresistive domains being component parts of said stress sensing circuit with said third semiconductor piezoresistive domain first terminating region being electrically connected to said first semiconductor piezoresistive domain first terminating region, and with said first semiconductor piezoresistive domain second terminating region being electrically connected to said second semiconductor piezoresistive domain second terminating region, and with said fourth semiconductor piezoresistive domain first terminating region being electrically connected to said second semiconductor piezoresistive domain first terminating region, and with said third semiconductor piezoresistive domain second terminating region being electrically connected to said fourth semiconductor piezoresistive domain second terminating region.

4. The system of claim 3 wherein there is further provided a second primarily resistive domain adjacent to said major surface and supported by said structure, said second primarily resistive domain having first and second terminating regions, said second primarily resistive domain having a temperature coefficient of resistance of a magnitude substantially less than said first magnitude, said second primarily resistive domain being substantially free of effects in electrical behavior in response to stresses applied to said diaphragm, and said second primarily resistive domain being a component part of said stress sensing circuit with said second primarily resistive domain first terminating region being electrically connected to said first semiconductor piezoresistive domain second terminating region.

5. The system of claim 4 wherein said second primarily resistive domain second terminating region is electrically connected to a first terminal means adapted for electrical connection to a first source of voltage.

6. The system of claim 4 wherein at least one of said first and second primarily resistive domains has a construction selected from first and second constructions with said first construction being in said semiconductor material at a said selected location, and so supported by said structure, as aforesaid, and with said second construction as a thin film outside said semiconductor material but supported by said structure as aforesaid.

7. The system of claim 3 wherein there is further provided a second semiconductor resistive domain in said semiconductor material at a said selected location and adjacent to said major surface, said second semiconductor resistive domain having first and second terminating regions, said second semiconductor resistive domain having substantially said first distribution of dopant atoms therein leading to said second semiconductor resistive domain being of said second conductivity type and having a temperature coefficient of resistance of substantially said first magnitude which is effective in said first magnitude direction, said second semiconductor resistive domain being substantially free of effects in electrical behavior in response to stresses applied to said diaphragm, said second semiconductor resistive domain being a component part of said stress sensing circuit with said second semiconductor resistive domain first terminating region being electrically connected to said first semiconductor piezoresistive domain second terminating region.

8. The system of claim 7 wherein there is further provided a second primarily resistive domain adjacent to said major surface and supported by said structure, said second primarily resistive domain having first and second terminating regions, said second primarily resistive domain having a temperature coefficient of resistance of a magnitude substantially less than said first magnitude, said second primarily resistive domain being substantially free of effects in electrical behavior in response to stresses applid to said diaphragm, and said second primarily resistive domain being a component part of said stress sensing circuit with said second primarily resistive domain first terminating region being electrically connected to said first semiconductor piezoresistive domain second terminating region.

9. The system of claim 3 wherein there is further provided a first operational amplifier in and on said semiconductor material in said structure adjacent to in part, and adjoining in part, said major surface, said first operational amplifier having a first input region which is capable of a high circuit impedance and having an output region which is capable of a low circuit impedance, said first operational amplifier being capable of providing a large magnitude gain in signals appearing at said first operational amplifier first output region over corresponding signals appearing at said first operational amplifier first input region, said first operational amplifier being electrically connected to first and second terminal means adapted for electrical connection to first and second sources of voltage, respectively, said first operational amplifier being part of said signal processing circuit with a selected one of said first semiconductor resistive domain and said first primarily resistive domain first terminating regions being electrically connected to said first operational amplifier first input region.

10. The system of claim 9 wherein a selected one of said first semiconductor resistive domain and said first primarily resistive domain second terminating regions is directly electrically connected to said first operational amplifier output region.

11. The system of claim 10 wherein:
said first operational amplifier has a second input region which is capable of a high circuit impedance, and with said first operational amplifier being capable of providing a large magnitude gain in an opposite magnitude direction for signals appearing at said first operational amplifier output region over corresponding signals appearing at said first operational amplifier first input region, and with said first operational amplifier being capable of providing a large magnitude gain in an identical magnitude direction for signals appearing at said first operational amplifier output region over corresponding signals appearing at said first operational amplifier second input region, said first operational amplifier second input region serving as said signal processing circuit first input region and said first semiconductor piezoresistive domain first terminating region serving as said stress sensing circuit first output region; and a second operational amplifier is further provided in and on said semiconductor material is said structure adjacent to in part, and adjoining in part, said major surface, said second operational amplifier having a first input region which is capable of a high circuit impedance, a second input region which is capable of a high circuit impedance, and an output region which is capable of a low circuit impedance, said second operational amplifier being capable of providing a large magnitude gain in an opposite magnitude direction for signals appearing at said second operational amplifier output region over corresponding signals appearing at said second operational amplifier first input region, said second operational amplifier being capable of providing a large magnitude gain in an identical magnitude direction for signals appearing at said second operational amplifier output region over corresponding signals appearing at said second operational amplifier second input region, said second operational amplifier being electrically connected to third and fourth terminal means adapted for electrical connection to third and fourth sources of voltage, respectively, said second operational amplifier being a part of said signal processing circuit with that one remaining of said first semiconductor resistive domain and said first primarily resistive domain second terminating regions, after selection of one thereof to be directly electrically connected to said first operational amplifier output region, as aforesaid, being electrically connected to said second operational amplifier first input region, and with each of said first semiconductor resistive domain and said first primarily resistive domain first terminating regions being electrically connected to said first operational amplifier first input region, and with said second semiconductor piezoresistive domain first terminating region serving as a second output region of said stress sensing circuit and being electrically connected to said second operational amplifier second input region serving as a second input region of said signal processing circuit.

12. The system of claim 10 wherein there is further provided a second primarily resistive domain adjacent to said major surface and supported by said structure, said second primarily resistive domain having first and second terminating regions, said second primarily resistive domain being substantially free of effects in electrical behavior in response to stresses applied to said diaphragm, and said second primarily resistive domain being a component part of said signal processing circuit with said first semiconductor resistive domain and said first primarily resistive domain first terminating regions each being electrically connected to said first operational amplifier first input region through said second primarily resistive domain by having said second primarily resistive domain first terminating region directly electrically connected to said first operational amplifier first input region and by having said second primarily resistive domain second terminating region directly electrically connected to each of said first semiconductor resistive domain and said first primarily resistive domain first terminating regions.

13. The system of claim 9 wherein said first operational amplifier has a second input region which is capable of a high circuit impedance, and with said first operational amplifier being capable of providing a large magnitude gain in an opposite magnitude direction for signals appearing at said first operational amplifier output region over corresponding signals appearing at said first operational amplifier first input region, and with said first operational amplifier being capable of providing a large magnitude gain in an identical magnitude direction for signals appearing at said first operational amplifier output region over corresponding signals appearing at said first operational amplifier second input region, said first operational amplifier second input region serving as said signal processing circuit first input region and said first semiconductor piezoresistive domain first terminating region serving as said stress sensing circuit first output region.

14. The system of claim 3 wherein said first distribution of dopant atoms has a maximum concentration of between $10^{17}$ atoms/cm$^3$ and $10^{19}$ atoms/cm$^3$.

15. The system of claim 2 wherein there is further provided a second primarily resistive domain adjacent to said major surface and supported by said structure, said second primarily resistive domain having first and second terminating regions, said second primarily resistive domain having a temperature coefficient of resistance of a magnitude substantially less than said first magnitude, said second primarily resistive domain being substantially free of effects in electrical behavior in response to stresses applied to said diaphragm, and said second primarily resistive domain being a component part of said stress sensing circuit with said second primarily resistive domain first terminating region being electrically connected to said first semiconductor piezoresistive domain second terminating region.

16. The system of claim 15 wherein said second primarily resistive domain second terminating region is electrically connected to a first terminal means adapted for electrical connection to a first source of voltage.

17. The system of claim 15 wherein at least one of said first and second primarily resistive domains has a construction selected from first and second constructions with said first construction being in said semiconductor material at a said selected location, and so supported by said structure, as aforesaid, and with said second construction being as a thin film outside said semiconductor material but supported by said structure as aforesaid.

18. The system of claim 2 wherein there is further provided a second semiconductor resistive domain in said semiconductor material at a said selected location and adjacent to said major surface, said second semiconductor resistive domain having first and second terminating regions, said second semiconductor resistive domain having substantially said first distribution of dopant atoms therein leading to said second semiconductor resistive domain being of said second conductivity type and having a temperature coefficient of substantially resistance of substantially said first magnitude which is effective in said first magnitude direction, said second semiconductor resistive domain being substantially free of effects in electrical behavior in response to stresses applied to said diaphragm, said second semiconductor resistive domain being a component part of said stress sensing circuit with said second semiconductor resistive domain first terminating region being electrically connected to said first semiconductor piezoresistive domain second terminating region.

19. The system of claim 18 wherein there is further provided a second primarily resistive domain adjacent to said major surface and supported by said structure, said second primarily resistive domain having first and second terminating regions, said second primarily resistive domain having a temperature coefficient of resistance of a magnitude substantially less than said first magnitude, said second primarily resistive domain being substantially free of effects in electrical behavior in response to stresses applied to said diaphragm, and said second primarily resistive domain being a component part of said stress sensing circuit with said second primarily resistive domain first terminating region being electrically connected to said first semiconductor piezoresistive domain second terminating region.

20. The system of claim 18 wherein there is further provided a third semiconductor resistive domain in said semiconductor material at a said selected location and adjacent to said major surface, said third semiconductor resistive domain having first and second terminating regions, said third semiconductor resistive domain having substantially said first distribution of dopant atoms therein leading to said third semiconductor resistive domain being of said second conductivity type and having a temperature coefficient of resistance of substantially said first magnitude which is effective in said first magnitude direction, said third semiconductor resistive domain being substantially free of effects in electrical behavior in response to stresses applied to said diaphragm, said third semiconductor resistive domain being a component part of said stress sensing circuit with said third semiconductor resistive domain first terminating region being electrically connected to said second semiconductor piezoresistive domain second terminating region, and with said third semiconductor resistive domain electrically connecting said second semiconductor piezoresistive domain second terminating region to said first semiconductor piezoresistive domain second terminating region through said second semiconductor resistive domain by said third semiconductor resistive domain second terminating region being electrically connected to said second semiconductor resistive domain second terminating region.

21. The system of claim 20 wherein there is further provided a second primarily resistive domain adjacent to said major surface and supported by said structure, said second primarily resistive domain having first and second terminating regions, said second primarily resistive domain having a temperature coefficient of resistance of a magnitude substantially less than said first magnitude, said second primarily resistive domain being substantially free of effects in electrical behavior in response to stresses applied to said diaphragm, and said second primarily resistive domain being a component part of said stress sensing circuit with said second primarily resistive domain first terminating region being electrically connected to said first semiconductor piezoresistive domain second terminating region.

22. The system of claim 21 wherein:

third and fourth semiconductor piezoresistive domains are further provided each in said semiconductor material at a said selected location extending at least in part into said diaphragm, and each provided adjacent to said major surface, said third semiconductor piezoresistive domain having first and second terminating regions and said fourth semiconductor piezoresistive domain having first and second terminating regions, said third and fourth semiconductor piezoresistive domains each having substantially said first distribution of dopant atoms therein leading to each of said third and fourth semiconductor piezoresistive domains being of said second conductivity type and each having a temperature coefficient of resistance of substantially said first magnitude which is effective in said first magnitude direction, said third and fourth semiconductor piezoresistive domains being component parts of said stress sensing circuit with said third semiconductor piezoresistive domain first terminating region being electrically connected to said first semiconductor piezoresistive domain first terminating region, and with said fourth semiconductor piezoresistive domain first terminating region being electrically connected to said second semiconductor piezoresistive domain first terminating region, and with said first semiconductor piezoresistive domain second terminating region being electrically connected to said second semiconductor piezoresistive domain second terminating region, and with said third semiconductor piezoresistive domain second terminating region being electrically connected to said fourth semiconductor piezoresistive domain second terminating region; and a third primarily resistive domain adjacent to said major surface and supported by said structure, said third primarily resistive domain having first and second terminating regions, said third primarily resistive domain having first and second terminating regions, said third primarily resistive domain having a temperature coefficient of resistance of a magnitude substantially less than said first magnitude, said third primarily resistive domain being substantially free of effects in electrical behavior in response to stresses applied to said diaphragm, and said third primarily resistive domain being a component part of said stress sensing circuit with said third primarily resistive domain first terminating region being electrically connected to said third semiconductor piezoresistive domain second terminating region.

23. The system of claim 22 wherein said third primarily resistive domain second terminating region is electrically connected to a first terminal means adapted for electrical connection to a first source of voltage, and wherein said second primarily resistive domain second terminating region is electrically connected to said second semiconductor resistive domain second terminating region, said second semiconductor resistive domain second terminating region being electrically connected to a second terminal means adapted for electrical connection to a second source of voltage.

24. The system of claim 2 wherein there is further provided a first operational amplifier in and on said semiconductor material in said structure adjacent to in part, and adjoining in part, said major surface, said first operational amplifier having a first input region which is capable of a high circuit impedance and having an output region which is capable of a low circuit impedance, said first operational amplifier being capable of providing a large magnitude gain in signals appearing at said first operational amplifier output region over corresponding signals appearing at said first operational amplifier first input region, said first operational amplifier being electrically connected to first and second terminal means adapted for electrical connection to first and second sources of voltage, respectively, said first operational amplifier being part of said signal processing circuit with a selected one of said first semiconductor resistive domain and said first primarily resistive domain first terminating regions being electrically connected to said first operational amplifier first input region.

25. The system of claim 24 wherein a selected one of said first semiconductor resistive domain and said first primarily resistive domain second terminating regions is directly electrically connected to said first operational amplifier output region.

26. The system of claim 25 wherein:
said first operational amplifier has a second input region which is capable of a high circuit impedance, and with said first operational amplifier being capable of providing a large magnitude gain in an opposite magnitude direction for signals appearing at said first operational amplifier output region over corresponding signals appearing at said first operational amplifier first input region, and with said first operational amplifier being capable of providing a large magnitude gain in an identical magnitude direction for signals appearing at said first operational amplifier output region over corresponding signals appearing at said first operational amplifier second input region, said first operational amplifier second input region serving as said signal processing circuit first input region and said first semiconductor piezoresistive domain first terminating region serving as said stress sensing circuit first output region; and a second operational amplifier is further provided in and on said semiconductor material in said structure adjacent to in part, and adjoining in part, said major surface, said second operational amplifier having a first input region which is capable of a high circuit impedance, a second input region which is capable of a high circuit impedance, and an output region which is capable of a low circuit impedance, said second operational amplifier being capable of providing a large magnitude gain in an opposite magnitude direction for signals appearing at said second operational amplifier output region over corresponding signals appearing at said second operational amplifier first input region, said second operational amplifier being capable of providing a large magnitude gain in an identical magnitude direction for signals appearing at said second operational amplifier output region over corresponding signals appearing at said second operational amplifier second input region, said second operational amplifier being electrically connected to third and fourth terminal means adapted for electrical connection to third and fourth sources of voltage, respectively, said second operational amplifier being a part of said signal processing circuit with that one remaining of said first semiconductor resistive domain and said first primarily resistive domain second terminating regions, after selection of one thereof to be directly electrically connected to said first operational amplifier output region, as aforesaid, being electrically connected to said second operational amplifier first input region, and with each of said first semiconductor resistive domain and said first primarily resistive domain first terminating regions being electrically connected to said first operational amplifier first input region, and with said second semiconductor piezoresistive domain first terminating region serving as a second output region of said stress sensing circuit and being electrically connected to said second operational amplifier second input region serving as a second input region of said signal processing circuit, and with said first semiconductor piezoresistive domain second terminating region being electrically connected to said second semiconductor piezoresistive domain second terminating region.

27. The system of claim 26 or 11 wherein there is further provided a second primarily resistive domain adjacent to said major surface and supported by said structure, said second primarily resistive domain having first and second terminating regions, said second primarily resistive domain being substantially free of effects in electrical behavior in response to stress applied to said diaphragm, and said second primarily resistive domain being a component part of said signal processing circuit with said first semiconductor resistive domain and said first primarily resistive domain first terminating regions each being electrically connected to said first operational amplifier first input region through said second primarily resistive domain by having said second primarily resistive domain first terminating region directly electrically connected to said first operational amplifier first input region and by having said second primarily resistive domain second terminating region directly electrically connected to each of said first semiconductor resistive domain and said first primarily resistive domain first terminating regions.

28. The system of claim 26 or 11 wherein:
second, third, fourth and fifth primarily resistive domains are further provided each adjacent to said major surface and supported by said structure, each of said second, third, fourth and fifth primarily resistive domains having first and second terminating regions, each of said second, third, fourth and fifth primarily resistive domains being substantially free of effects in electrical behavior in response to stresses applied to said diaphragm, with said second, third, fourth and fifth primarily resistive domains being component parts of said signal processing circuit, said second primarily resistive domain first terminating region being electrically connected to said first operational amplifier first input region, said second primarily resistive domain second terminating region being electrically connected to said third primarily resistive domain second terminating region and to said fourth primarily resistive domain first terminating region, said third primarily resistive domain first terminating region being electrically connected to said second operational amplifier first input region; and
a second semiconductor resistive domain is further provided in said semiconductor material at a said selected location and adjacent to said major surface, said second semiconductor resistive domain having first and second terminating regions, said second semiconductor resistive domain having substantially said first distribution of dopant atoms therein leading to said second semiconductor resistive domain being of said second conductivity type and having a temperature coefficient of resistance of substantially said first magnitude which is effective in said first magnitude direction, said second semiconductor resistive domain being substantially free of effects in electrical behavior in response to stresses applied to said diaphragm, said second semiconductor resistive domain being a component part of said signal processing circuit with said second semiconductor resistive domain second terminating region being electrically connected to said fourth primarily resistive domain second terminating region and to said fifth primarily resistive domain first terminating region, and with said second semiconductor resistive domain first terminating region and said fifth primarily resistive domain second terminating region being electrically connected to fifth and sixth terminal means, respectively, adapted for electrical connection to fifth and sixth sources of voltage, respectively.

29. The system of claim 28 wherein there is further provided sixth primarily resistive domain adjacent to said major surface and supported by said structure, said sixth primarily resistive domain having first and second terminating regions, said sixth primarily resistive domain having a temperature coefficient of resistance of a magnitude substantially less than said first magnitude, said sixth primarily resistive domain being substantially free of effects in electrical behavior in response to stresses applied to said diaphragm, said sixth primarily resistive domain being a component part of said stress sensing circuit and with said sixth primarily resistive domain first terminating region being electrically connected to said first semiconductor piezoresistive domain second terminating region, and with said sixth primarily resistive domain second terminating region being electrically connected to a selected one of said fifth and sixth terminal means.

30. The system of claim 26 or 11 wherein there is provided an output transformation means in and on said semiconductor material in said structure adjacent to in part, and adjoining in part, said major surface, said output transformation means having first and second input regions and an output region, said output transformation means being capable of providing signals at said output transformation means output region corresponding in an opposite magnitude direction to signals appearing at said output transformation means first input region and said output transformation means being capable of providing signals at said output transformation means output region identical in magnitude direction to signals appearing at said output transformation means second input region, said output transformation means being electrically connected to fifth and sixth terminal means adapted for electrical connection to fifth and sixth sources of voltage, respectively, said output transformation means being part of said signal processing circuit with said first operational amplifier output region being electrically connected to said output transformation means first input region and said second operational amplifier output region being electrically connected to said output transformation means second input region, said output transformation means output region serving as an output region for said signal processing circuit.

31. The system of claim 30 wherein:
a third operational amplifier is further provided in and on said semiconductor material in said structure adjacent to in part, and adjoining in part, said major surface as a part of said output transformation means, said third operational amplifier having a first input region which is capable of a high circuit impedance, a second input region which is capable of a high circuit impedance, and an output region which is capable of a low circuit impedance, said third operational amplifier being capable of providing a large magnitude gain in an opposite magnitude direction for signals appearing at said third operational amplifier output region over corresponding signals appearing at said third operational amplifier first input region, said third operational amplifier being capable of providing a large magnitude gain in an identical magnitude direction for signals appearing at said third operational amplifier output region over corresponding signals appearing at said third operational amplifier second input region, said third operational amplifier being electrically connected to fifth and sixth terminal means adapted for electrical connection to fifth and sixth sources of voltage, respectively, said third operational amplifier output region serving as said output transformation means output region; and
second, third, fourth, fifth, sixth, seventh and eighth primarily resistive domains are further provided each adjacent to said major surface and supported by said structure as a part of said output transformation means, said second, third, fourth, fifth, sixth, seventh and eighth primarily resistive domains each having first and second terminating regions, each of said second, third, fourth, fifth, sixth, seventh and eighth primarily resistive domains being substantially free of effects in electrical behavior in response to stresses applied to said diaphragm, with said second terminating region of said second, fourth and fifth primarily resistive domains being electrically connected to one another and to said third primarily resistive domain first terminating region, said second primarily resistive domain first terminating region being electrically connected to both said sixth primarily resistive domain second terminating region and to said first operational amplifier output region, said fourth primarily resistive domain first terminating region being electrically connected to said seventh primarily resistive domain second terminating region and to said second operational amplifier output region, said fifth primarily resistive domain first terminating region being electrically connected to said seventh primarily resistive domain first terminating region and to said third operational amplifier second input region, said sixth primarily resistive domain first terminating region being electrically connected to said eighth primarily resistive domain first terminating region and to said third operational amplifier first input region, and said eighth primarily resistive domain second terminating region being electrically connected to said third operational amplifier output region, said second primarily resistive domain first terminating region and said sixth primarily resistive domain second terminating region together serving as said output transformation means first input region and said fourth primarily resistive domain first terminating region and said seventh primarily resistive domain second terminating region together serving as said output transformation means second input region.

32. The system of claim 30 wherein:
a third operational amplifier is further provided in and on said semiconductor material in said structure adjacent to in part, and adjoining in part, said major surface as a part of said output transformation means, said third operational amplifier having a first input region which is capable of a high circuit impedance, a second input region which is capable of a high circuit impedance, and an output region which is capable of a low circuit impedance, said third operational amplifier being capable of providing a large magnitude gain in an opposite magnitude direction for signals appearing at said third operational amplifier output region over corresponding signals appearing at said third operational amplifier first input region, said third operational amplifier being capable of providing a large magnitude gain in an identical magnitude direction for signals appearing at said third operational amplifier output region over corresponding signals appearing at said third operational amplifier second input region, said third operational amplifier being electrically connected to fifth and sixth terminal means adapted for electrical connection to fifth and sixth sources of voltage, respectively, said third operational amplifier output region serving as said output transformation means output region; and
second, third and fourth primarily resistive domains are further provided each adjacent to said major surface and supported by said structure as a part of said output transformation means, said second, third and fourth primarily resistive domains having first and second terminating regions, each of said second, third and fourth primarily resistive domains being substantially free of effects in electrically behavior in response to stresses applied to said diaphragm, with said second primarily resistive means second terminating region being electrically connected to said first operational amplifier output region, said second primarily resistive means first terminating region being electrically connected to said fourth primarily resistive domain first terminating region and to said third operational amplifier first input region, said third primarily resistive domain second terminating region being electrically connected to said second operational amplifier output region, said third primarily resistive domain first terminating region being electrically connected to said third operational amplifier second input region, and said fourth primarily resistive domain second terminating region being electrically connected to said third operational amplifier output region, said second primarily resistive domain second terminating region serving as said output transformation means first input region and said third primarily resistive domain second terminating region serving as said output transformation means second input region.

33. The system of claim 32 wherein a voltage bias means is further provided adjacent to said major surface and supported by said structure as a part of said output transformation means, said voltage bias means having an output region, said voltage bias means being capable of providing a constant polarity voltage of a selected magnitude at said voltage bias means output region, said voltage bias means being electrically connected to a seventh terminal means adapted for electrical connection to a seventh source of voltage, said voltage bias means output region being electrically connected to a selected one of said third operational amplifier first and second input regions.

34. The system of claim 32 wherein a linearity circuit means is further provided adjacent to said major surface and supported by said structure as a part of said output transformation means, said linearity circuit means having first and second terminating regions, said linearity circuit means containing at least one diode means as a circuit component therein, said linearity circuit means first terminating region being electrically connected to said third operational amplifier first input region, said linearity circuit means second terminating region being electrically connected to a said output region of a selected one of said operational amplifiers.

35. The system of claim 26 or 11 wherein there is further provided an operational amplifier feedback resistive domain adjacent to said major surface and supported by said structure, said operational amplifier feedback resistive domain having first and second terminating regions, said operational amplifier feedback resistive domain being substantially free of effects in electrical behavior in response to stresses applied to said diaphragm, said operational amplifier feedback resistive domain being a component part of said signal processing circuit with said operational amplifier feedback resistive domain first terminating region being electrically connected to said second operational amplifier first input region and said operational amplifier feedback resistive domain second terminating region being directly electrically connected to said second operational amplifier output region.

36. The system of claim 35 wherein said first primarily resistive domain has a construction selected from first and second constructions with said first construction being in said semiconductor material at a said selected location, and so supported by said structure, as aforesaid, and with said second construction being as a thin film outside said semiconductor material but still supported by said structure as aforesaid.

37. The system of claim 25 wherein there is further provided a second primarily resistive domain adjacent to said major surface and supported by said structure, said second resistive domain having first and second terminating regions, said second primarily resistive domain being substantially free of effects in electrical behavior in response to stresses applied to said diaphragm, and said second primarily resistive domain being a component part of said signal processing circuit with said first semiconductor resistive domain and said first primarily resistive domain first terminating regions each being electrically connected to said first operational amplifier first input region through said second primarily resistive domain by having said second primarily resistive domain first terminating region directly electrically connected to said first operational amplifier first input region and by having said second primarily resistive domain second terminating region directly electrically connected to each of said first semiconductor resistive domain and said first primarily resistive domain first terminating regions.

38. The system of claim 24 wherein said first operational amplifier has a second input region which is capable of a high circuit impedance, and with said first operational amplifier being capable of providing a large magnitude gain in an opposite magnitude direction for signals appearing at said first operational amplifier output region over corresponding signals appearing at said first operational amplifier first input region, and with said first operational amplifier being capable of providing a large magnitude gain in an identical magnitude direction for signals appearing at said first operational amplifier output region over corresponding signals appearing at said first operational amplifier second input region, said first operational amplifier second input region serving as said signal processing circuit first input region and said first semiconductor piezoresistive domain first terminating region serving as said stress sensing circuit first output region.

39. The system of claim 2 wherein said first distribution of dopant atoms has a maximum concentration of between $10^{17}$ atoms/cm$^3$ and $10^{19}$ atoms/cm$^3$.

40. The system of claim 1 wherein there is further provided a second primarily resistive domain adjacent to said major surface and supported by said structure, said second primarily resistive domain having first and second terminating regions, said second primarily resistive domain having a temperature coefficient of resistance of a magnitude substantially less than said first magnitude, said second primarily resistive domain being substantially free of effects in electrical behavior in response to stresses applied to said diaphragm, and said second primarily resistive domain being a component part of said stress sensing circuit with said second primarily resistive domain first terminating region being electrically connected to said first semiconductor piezoresistive domain second terminating region.

41. The system of claim 40 wherein said second primarily resistive domain second terminating region is electrically connected to a first terminal means adapted for electrical connection to a first source of voltage.

42. The system of claim 40 wherein at least one of said first and second primarily resistive domains has a construction selected from first and second constructions with said first construction being in said semiconductor material at a said selected location, and so supported by said structure, as aforesaid, and with said second construction being as a thin film outside said semiconductor material but supported by said structure as aforesaid.

43. The system of claim 1 wherein there is further provided a second semiconductor resistive domain in said semiconductor material at a said selected location and adjacent to said major surface, said second semiconductor resistive domain having first and second terminating regions, said second semiconductor resistive domain having substantially said first distribution of atoms therein leading to said second semiconductor resistive domain being of said second conductivity type and having a temperature coefficient of resistance of substantially said first magnitude which is effective in said first magnitude direction, second semiconductor resistive domain being substantially free of effects in electrical behavior in response to stresses applied to said diaphragm, said second semiconductor resistive domain being a component part of said stress sensing circuit with said second semiconductor resistive domain first terminating region being electrically connected to said first semiconductor piezoresistive domain second terminating region.

44. The system of claim 43 wherein there is further provided a second primarily resistive domain adjacent to said major surface and supported by said structure, said second primarily resistive domain having first and second terminating regions, said second primarily resistive domain having a temperature coefficient of resistance of a magnitude substantially less than said first magnitude, said second primarily resistive domain being substantially free of effects in electrical behavior in response to stresses applied to said diaphragm, and said second primarily resistive domain being a component part of said stress sensing circuit with said second primarily resistive domain first terminating region being electrically connected to said first semiconductor piezoresistive domain second terminating region.

45. The system of claim 1 wherein there is further provided a first operational amplifier in and on said semiconductor material in said structure adjacent to in part, and adjoining in part, said major surface, said first operational amplifier having a first input region which is capable of a high circuit impedance and having an output region which is capable of a low circuit impedance, said first operational amplifier being capable of providing a large magnitude gain in signals appearing at said first operational amplifier output region over corresponding signals appearing at said first operational amplifier first input region, said first operational amplifier being electrically connected to first and second terminal means adapted for electrical connection to first and second sources of voltage, respectively, said first operational amplifier being part of said signal processing circuit with a selected one of said first semiconductor resistive domain and said first primarily resistive domain first terminating regions being electrically connected to said first operational amplifier first input region.

46. The system of claim 45 wherein a selected one of said first semiconductor resistive domain and said first primarily resistive domain second terminating regions is directly electrically connected to said first operational amplifier output region.

47. The system of claim 46 wherein said first distribution of dopant atoms has a maximum concentration of between $10^{17}$ atoms/cm$^3$ and $10^{19}$ atoms/cm$^3$.

48. The system of claim 46 wherein there is further provided a second primarily resistive domain adjacent to said major surface and supported by said structure, said second primarily resistive domain having first and second terminating regions, said second primarily resistive domain being substantially free of effects in electrical behavior in response to stresses applied to said diaphragm, and said second primarily resistive domain being a component part of said signal processing circuit with said first semiconductor resistive domain and said first primarily resistive domain first terminating regions each being electrically connected to said first operational amplifier first input region through said second primarily resistive domain by having said second primarily resistive domain first terminating region directly electrically connected to said first operational amplifier first input region and by having said second primarily resistive domain second terminating region directly electrically connected to each of said first semiconductor resistive domain and said first primarily resistive domain first terminating regions.

49. The system of claim 45 wherein said first operational amplifier has a second input region which is capable of a high circuit impedance, and with said first operational amplifier being capable of providing a large magnitude gain in an opposite magnitude direction for signals appearing at said first operational amplifier output region over corresponding signals appearing at said first operational amplifier first input region, and with said first operational amplifier being capable of providing a large magnitude gain in an identical magnitude direction for signals appearing at said first operational amplifier output region over corresponding signals appearing at said first operational amplifier second input region, said first operational amplifier second input region serving as said signal processing circuit first input region and said first semiconductor piezoresistive domain first terminating region serving as said stress sensing circuit first output region.

50. The system of claim 45 wherein said first distribution of dopant atoms has a maximum concentration of between $10^{17}$ atoms/cm$^3$ and $10^{19}$ atoms/cm$^3$.

51. The system of claim 1 wherein said first distribution of dopant atoms has a maximum concentration of between $10^{17}$ atoms/cm$^3$ and $10^{19}$ atoms/cm$^3$.

52. A stress transducing system supported in and on a semiconductor material stress sensing structure having structural portions including substantially a diaphragm and a constraint for constraining said diaphragm at peripheral portions thereof, with said structure having a major surface bounding semiconductor material, said semiconductor material being of a first conductivity tape except in selected locations thereof, said major surface being common to both said diaphragm and said constraint, said stress transducing system comprising:

a first semiconductor piezoresistive domain in said semiconductor material at a said selected location extending at least in part into said diaphragm, and with said domain being adjacent to said major surface, said first semiconductor piezoresistive domain having first and second terminating regions, said first semiconductor piezoresistive domain having therein a first distribution of dopant atoms with depth into said semiconductor material away from said major surface which leads to said first semiconductor piezoresistive domain being of a second conductivity type and having a temperature coefficient of resistance of a first magnitude which is effective in a first magnitude direction, said first semiconductor piezoresistive domain being a component part of a stress sensing circuit which is capable of providing a stress sensing circuit first output signal at a stress sensing circuit first output region of a magnitude varying in correspondence to changes in magnitude of stress applied to said diaphragm, said stress sensing circuit first output signal varying with such stess, as aforesaid, in a manner characteristic of said first semiconductor piezoresistive domain and remaining portions of said structure to thereby establish a stress sensing characteristic which characteristic also depends upon temperatures occurring in said structure;

a first semiconductor resistive domain in said semiconductor material at a said selected location and adjacent to said major surface, said first semiconductor resistive domain having first and second terminating regions, said first semiconductor resistive domain having substantially said first distribution of dopant atoms therein leading to said first semiconductor resistive domain being of said second conductivity type and having a temperature coefficient of resistance of substantially said first magnitude which is effective in said first magnitude direction, said first semiconductor resistive domain being substantially free of effects in electrical behavior in response to stresses applied to said diaphragm, said first semiconductor resistive domain being a component part of a signal processing circuit having a signal processing circuit first input region which is electrically connected to said stress sensing circuit first output region and having a signal processing circuit output region, said signal processing circuit being capable of providing a stress transducer system output signal at said signal processing circuit output region which is a version of said stress sensing circuit first output signal but as compensated to be substantially free of effects of said temperature dependence in said stress sensing circuit characteristic; and a first operational amplifier in and on said semiconductor material in said structure adjacent to in part, and adjoining in part, said major surface, said first operational amplifier having a first input region which is capable of a high circuit impedance and having an output region which is capable of a low circuit impedance, said first operational amplifier being capable of providing a large magnitude gain in signals appearing at said first operational amplifier output region over corresponding signals appearing at said first operational amplifier first input region, said first operational amplifier being electrically connected to first and second terminal means adapted for electrical connection to first and second sources of voltage, respectively, said first operational amplifier being part of said signal processing circuit with said first semiconductor resistive domain first terminating region being electrically connected to said first operational amplifier first input region.

53. The system of claim 52 wherein there is further provided a second semiconductor piezoresistive domain in said semiconductor material at a said selected location extending at least in part into said diaphragm, and provided adjacent to said major surface, said second semiconductor piezoresistive domain having first and second terminating regions, said second semiconductor piezoresistive domain having substantially said first distribution of dopant atoms therein leading to said second semiconductor piezoresistive domain being of said second conductivity type and having a temperature coefficient of resistance of substantially said first magnitude which is effective in said first magnitude direction, said second semiconductor piezoresistive domain being a component part of said stress sensing circuit with a selected one of said second semiconductor piezoresistive domain first and second terminating regions being electrically connected to a selected one of said first semiconductor piezoresistive domain first and second terminating regions.

54. The system of claim 53 wherein there is further provided third and fourth semiconductor piezoresistive domains each in said semiconductor material at a said selected location extending at least in part into said diaphragm, and each provided adjacent to said major surface, said third semiconductor piezoresistive domain having first and second terminating regions and said fourth semiconductor piezoresistive domain having first and second terminating regions, said third and fourth semiconductor piezoresistive domains each having substantially said first distribution of dopant atoms therein leading to each of said third and fourth semiconductor piezoresistive domains being of said second conductivity type and each having a temperature coefficient of resistance of substantially said first magnitude which is effective in said first magnitude direction, said third and fourth semiconductor piezoresistive domains being component parts of said stress sensing circuit with said third semiconductor piezoresistive domain first terminating region being electrically connected to said first semiconductor piezoresistive domain first terminating region, and with said fourth semiconductor piezoresistive domain first terminating region being electrically connected to said second semiconductor piezoresistive domain first terminating region, and with said first semiconductor piezoresistive domain second terminating region being electrically connected to said second semiconductor piezoresistive domain second terminating region, and with said third semiconductor piezoresistive domain second terminating region being electrically connected to said fourth semiconductor piezoresistive domain second terminating region.

55. The system of claim 52 wherein said first distribution of dopant atoms has a maximum concentration of between $10^{17}$ atoms/cm$^3$ and $10^{19}$ atoms/cm$^3$.

56. The system of claim 52 wherein said first operational amplifier has a second input region which is capable of a high circuit impedance, and with said first operational amplifier being capable of providing a large magnitude gain in an opposite magnitude direction for signals appearing at said first operational amplifier output region over corresponding signals appearing at said first operational amplifier first input, region and with said first operational amplifier being capable of providing a large magnitude gain in an identical magnitude direction for signals appearing at said first operational amplifier output region over corresponding signals appearing at said first operational amplifier second input region, said first operational amplifier second input region serving as said signal processing circuit first input region and said first semiconductor piezoresistive domain first terminating region serving as said stress sensing circuit first output region, said first semiconductor resistive domain second terminating region being electrically connected to said first operational amplifier output region.

57. The system of claim 56 wherein said first distribution of dopant atoms has a maximum concentration of between $10^{17}$ atoms/cm$^3$ and $10^{19}$ atoms/cm$^3$.

58. A stress transducing system supported in and on a semiconductor material stress sensing structure having structural portions including substantially a diaphragm and a constraint for constraining said diaphragm at peripheral portions thereof, with said structure having a major surface bounding semiconductor material, said semiconductor material being of a first conductivity type except in selected locations thereof, said major surface being common to both said diaphragm and said constraint, said stress transducing system comprising:

first, second, third and fourth semiconductor piezoresistive domains each in said semiconductor material at a said selected location extending at least in part into said diaphragm, and each provided adjacent to said major surface, said first, second, third and fourth semiconductor piezoresistive domains each having first and second terminating regions, said first, second, third and fourth semiconductor piezoresistive domains each having therein substantially a first distribution of dopant atoms which leads to each of said first, second, third and fourth semiconductor piezoresistive domains being of a second conductivity type and each having a temperature coefficient of resistance of substantially a first magnitude which is effective in a first magnitude direction, said first, second, third and fourth semiconductor piezoresistive domains being component parts of a stress sensing circuit which is capable of providing a stress sensing circuit first output signal at a stress sensing circuit first output region of a magnitude varying in correspondence to changes in magnitude of stress applied to said diaphragm, said stress sensing circuit first output signal varying with such stress, as aforesaid, in a manner characteristic of said first, second, third and fourth semiconductor piezoresistive domains and remaining portions of said structure to thereby establish a stress sensing characteristic which characteristic also depends upon temperatures occurring in said structure, said first semiconductor piezoresistive domain second terminating region and said second semiconductor piezoresistive domain second terminating region being electrically connected to one another, said first semiconductor piezoresistive domain first terminating region being electrically connected to said third semiconductor piezoresistive domain first terminating region, and said second semiconductor piezoresistive domain first terminating region being electrically connected to said fourth semiconductor piezoresistive domain first terminating region; and a first primarily resistive domain adjacent to said major surface and supported by said structure, said first primarily resistive domain having first and second terminating regions, said first primarily resistive domain having a temperature coefficient of resistance of a magnitude substantially less than said first magnitude, said first primarily resistive domain being substantially free of effects in electrical behavior in response to stresses applied to said diaphragm, said first primarily resistive domain being part of said stress sensing circuit with said first primarily resistive domain first terminating region being electrically connected to said first and second semiconductor piezoresistive domain second terminating regions and with said first primarily resistive domain second terminating region being electrically connected to a first terminal means adapted for electrical connection to a first source of voltage, and with said third and fourth semiconductor piezoresistive domains second terminating regions being electrically connected to a second terminal means adapted for electrical connection to a second source of voltage.

59. A stress transducing system supported in and on a semiconductor material stress sensing structure having structural portions including substantially a diaphragm and a constraint for constraining said diaphragm at peripheral portions thereof, with said structure having a major surface bounding semiconductor material, said semiconductor material being of a first conductivity type except in selected locations thereof, said major surface being common to both said diaphragm and said constraint, said stress transducing system comprising:

first, second, third and fourth semiconductor piezoresistive domains each in said semiconductor material at a said selected location extending at least in part into said diaphragm, and each provided adjacent to said major surface, said first, second, third and fourth semiconductor piezoresistive domains each having first and second terminating regions, said first, second, third and fourth semiconductor piezoresistive domains each having therein substantially a first distribution of dopant atoms which leads to each of said first, second, third and fourth semiconductor piezoresistive domains being of a second conductivity type and each having a temperature coefficient of resistance of substantially a first magnitude which is effective in a first magnitude direction, said first, second, third and fourth semiconductor piezoresistive domains being component parts of a stress sensing circuit which is capable of providing a stress sensing circuit first output signal at a stress sensing circuit first output region of a magnitude varying in correspondence to changes in magnitude of stress applied to said diaphragm, said stress sensing circuit first output signal varying with such stress, as aforesaid, in a manner characteristic of said first, second, third and fourth semiconductor piezoresistive domains and remaining portions of said structure to thereby establish a stress sensing characteristic which characteristic also depends upon temperatures occurring in said structure, said first semiconductor piezoresistive domain second terminating region and said second semiconductor piezoresistive domain second terminating region being electrically connected to one another, said first semiconductor piezoresistive domain first terminating region being electrically connected to said third semiconductor piezoresistive domain first terminating region, and said second semiconductor piezoresistive domain first terminating region being electrically connected to said fourth semiconductor piezoresistive domain first terminating region;

first and second semiconductor resistive domains each in said semiconductor material at a said selected location and adjacent to said major surface, said first semiconductor resistive domain having first and second terminating regions and said second semiconductor resistive domain having first and second terminating regions, said first and second semiconductor resistive domains each having substantially said first distribution of dopant atoms therein leading to said first and second semiconductor resistive domains each being of said second conductivity type and each having a temperature coefficient of resistance of substantially said first magnitude which is effective in said first magnitude direction, said first and second semiconductor resistive domains each being substantially free of effects in electrical behavior in response to stresses applied to said diaphragm, said first and second semiconductor resistive domains being part of said stress sensing circuit with said first semiconductor resistive domain first terminating region being electrically connected to said third semiconductor piezoresistive domain second terminating region, and with said second semiconductor resistive domain first terminating region being electrically connected to said fourth semiconductor piezoresistive domain second terminating region, and with said first and second semiconductor resistive domains second terminating regions being connected to one another and to a first terminal means adapted for electrical connection to a first source of voltage, and with said first and second semiconductor piezoresistive domains second terminating regions being electrically connected to a second terminal means adapted for electrical connection to a second source of voltage; and first and second primarily resistive domains each adjacent to said major surface and supported by said structure, said first primarily resistive domain having first and second terminating regions and said second primarily resistive domain having first and second terminating regions, each of said first and second primarily resistive domains having temperature coefficients of resistance of a magnitude substantially less than said first magnitude, each of said first and second primarily resistive domains being substantially free of effects in electrical behavior in response to stresses applied to said diaphragm, said first and second primarily resistive domains being part of said stress sensing circuit with said first primarily resistive domain first terminating region being electrically connected to said first semiconductor resistive domain first terminating region, and with said first primarily resistive domain second terminating region being electrically connected to said first semiconductor resistive domain second terminating region, and with said second primarily resistive domain first terminating region being electrically connected to said second semiconductor resistive domain first terminating region, and with said second primarily resistive domain second terminating region being electrically connected to said second semiconductor resistive domain second terminating region.

* * * * *